(12) United States Patent
Akagawa et al.

(10) Patent No.: US 8,407,185 B2
(45) Date of Patent: Mar. 26, 2013

(54) COMPUTER, ITS PROCESSING METHOD, AND COMPUTER SYSTEM

(75) Inventors: Etsutaro Akagawa, Kawasaki (JP); Nobumitsu Takaoka, Sagamihara (JP); Masakuni Agetsuma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 12/666,696

(22) PCT Filed: Dec. 7, 2009

(86) PCT No.: PCT/JP2009/006673
§ 371 (c)(1),
(2), (4) Date: Dec. 24, 2009

(87) PCT Pub. No.: WO2011/070606
PCT Pub. Date: Jun. 16, 2011

(65) Prior Publication Data
US 2011/0191306 A1    Aug. 4, 2011

(51) Int. Cl.
*G06F 7/00* (2006.01)
*G06F 17/00* (2006.01)
(52) U.S. Cl. .................................................. 707/662
(58) Field of Classification Search .................... 707/662
See application file for complete search history.

(56) References Cited

U.S. PATENT DOCUMENTS

| 7,177,322 | B2 | 2/2007 | Cadden |
| 7,526,621 | B2 * | 4/2009 | Stuart et al. .................... 711/159 |
| 2006/0123232 | A1 | 6/2006 | Cannon et al. |
| 2007/0022259 | A1 | 1/2007 | Kitamura et al. |
| 2009/0125572 | A1 | 5/2009 | Cannon et al. |

FOREIGN PATENT DOCUMENTS

EP    1 688 832 A1    8/2006

* cited by examiner

*Primary Examiner* — James Trujillo
*Assistant Examiner* — Jeffrey Chang
(74) *Attorney, Agent, or Firm* — Mattingly & Malur, PC

(57) ABSTRACT

When a deletion request to delete a file system is made and a retention period of the file system to be deleted has not expired, the retention period end date and time is displayed at high speed.
A CPU 11 gives a retention period attribute to each file of a file system 16 and manages the furthest future retention period end date and time, from among the retention periods of the files, as a retention period end date and time of the file system. If a deletion request to delete the file system 16 is made and the retention period end date and time of the file system 16 is future time ahead of the current time when the deletion request is made, processing for deleting the file system 16 is stopped and the retention period end date and time of the file system 16 is displayed on a screen 235.

13 Claims, 27 Drawing Sheets

| File System Name | WORM | Retention Period End Date and Time | Counter | ... |
|---|---|---|---|---|
| filesystem1 | YES | 1-1-2080 | 1 | ... |
| filesystem2 | YES | 1-1-2050 | 2 | ... |
| ... | ... | ... | ... | ... |

| File System Name | WORM | Retention Period End Date and Time | Counter | ... |
|---|---|---|---|---|
| filesystem1 | YES | 1-1-2080 | 1 | ... |
| filesystem2 | YES | 1-1-2050 | 2 | ... |
| ... | ... | ... | ... | ... |

141, 142, 143, 144, 14

| I-node Number | Retention End Date and Time | ... |
|---|---|---|
| 1 | 1-1-2080 | ... |
| 2 | 1-1-2030 | ... |
| ... | ... | ... |

Create File System

Create File System

- 2351 — File system name: [          ]
- 2352 — WORM: ☑ Yes
- 2353 — Capacity: [          ] GB
- 2354 — Backup Target: [          ]
- 2355 — Backup Media: [          ]
- 2356 — Cache Server: [          ]

FIG.11

| File System Name 141 | WORM 142 | Retention Period End Date and Time 143 | File Name 145 | ... 14A |
|---|---|---|---|---|
| filesystem1 | YES | 1-1-2080 | /home/a/a.txt<br>/home/a/b.txt<br>... | ... |
| filesystem2 | YES | 1-1-2050 | /home/c/c.txt<br>/home/c/d.txt<br>... | ... |
| ... | ... | ... | ... | ... |

| Backup Source File System | Backup Apparatus | Backup Media | ... |
|---|---|---|---|
| filesystem1 | backup1 | tape1,tape2 | ... |
| filesystem2 | backup1 | tape3 | ... |
| ... | ... | ... | ... |

FIG.24

| File System Name | Cache Computer | ... |
|---|---|---|
| filesystem1 | remote1,remote2 | ... |
| filesystem2 | remote3 | ... |
| ... | ... | ... |

381 — File System Name
382 — Cache Computer
38

COMPUTER, ITS PROCESSING METHOD, AND COMPUTER SYSTEM

TECHNICAL FIELD

The present invention relates to a computer for managing a file system constituted from a plurality of files, a processing method for such a computer, and a computer system.

BACKGROUND ART

Recently, regulations obliging companies to store business documents and other data for a long period of time have been being strengthened. Storage apparatuses for storing files of such business documents and other data are required to have a function preventing alteration of data. In order to meet such a requirement, a file system having a WORM (Write Once Read Many) function (update prohibition function) is suggested.

Not only the function preventing alteration of data, but a function preventing deletion of files stored in a file system with the WORM function for a certain period of time (hereinafter sometimes referred to as the "retention period") is also required. In order to meet this requirement, the file system with the WORM function often has a retention function (deletion prohibition function). In that case, processing for deleting the file system with the WORM function must be designed to normally terminate only after retention periods of all the files stored in the file system have expired.

Furthermore, a function capable of deleting even a file once stored in a storage apparatus with the WORM function under special circumstances, by exercising a privilege of doing so, is also required.

In Patent Literature 1, the WORM function and the retention function are realized by storing the ID and retention period of an object (file) to be stored in a volume (file system) in one entry in a table and referring to that table when updating and deleting the object.

When one or more files are transferred to a WORM file system according to Patent Literature 2, the WORM function and the retention function are realized by storing a retention period end date and time of a file in the furthest future from among the retention end dates and times of the files, as the retention period end date and time of the file system.

CITATION LIST

Patent Literature

[PTL (Patent Literature) 1]
U.S. Pat. No. 7,177,322B
[PTL 2]
US Pub. 2006/0123232A

SUMMARY OF INVENTION

Technical Problem

When a volume (file system) is to be deleted in the system according to Patent Literature 1, it is necessary to search the system in order check if the retention periods of all the objects have expired. If there is any object whose retention period has not expired, there is a problem of long processing time to display the number of objects and the retention expiration dates and times of the objects, that is, the date and time when the relevant volume can be deleted.

If the file with the furthest future retention period end date and time is deleted by exercising the privilege in the system according to Patent Literature 2, the resultant problem is that the retention period end date and time of the file which does not actually exist will be displayed as the retention period end date and time of the file system.

The present invention was devised in light of the problems described above, and it is an object of the invention to provide a computer, its processing method, and computer system that are capable of displaying a retention period end date and time when a deletion request to delete a file system is made and if a retention period of the file system to be deleted has not expired yet.

Solution to Problem

In order to achieve the above-described object, the present invention is characterized in that an attribute of prohibiting deletion of each file until a retention period end date and time passes is given to each of a plurality of files belonging to a file system; the file system is managed by setting, as a deletion prohibition end date and time, a retention period end date and time that is most ahead in the future along a time axis from among retention periods of the respective files; and when a deletion request to delete the file system is made, and if the deletion prohibition end date and time of the file system is a future time ahead of the current time when the deletion request is made, the deletion prohibition end date and time of the file system is displayed on a display device.

Advantageous Effects of Invention

If a retention period of a file to be deleted has not expired yet, a retention period end date and time can be displayed at high speed according to this invention.

BRIEF DESCRIPTION OF DRAWINGS

FIG. 2 is a configuration diagram showing the configuration of a retention management table.

FIG. 5 is an interface diagram displayed on a screen for the management computer.

FIG. 11 is a configuration diagram showing the configuration of a retention file management table.

FIG. 24 is a configuration diagram showing the configuration of a cache management table.

DESCRIPTION OF EMBODIMENTS

Figure 1:
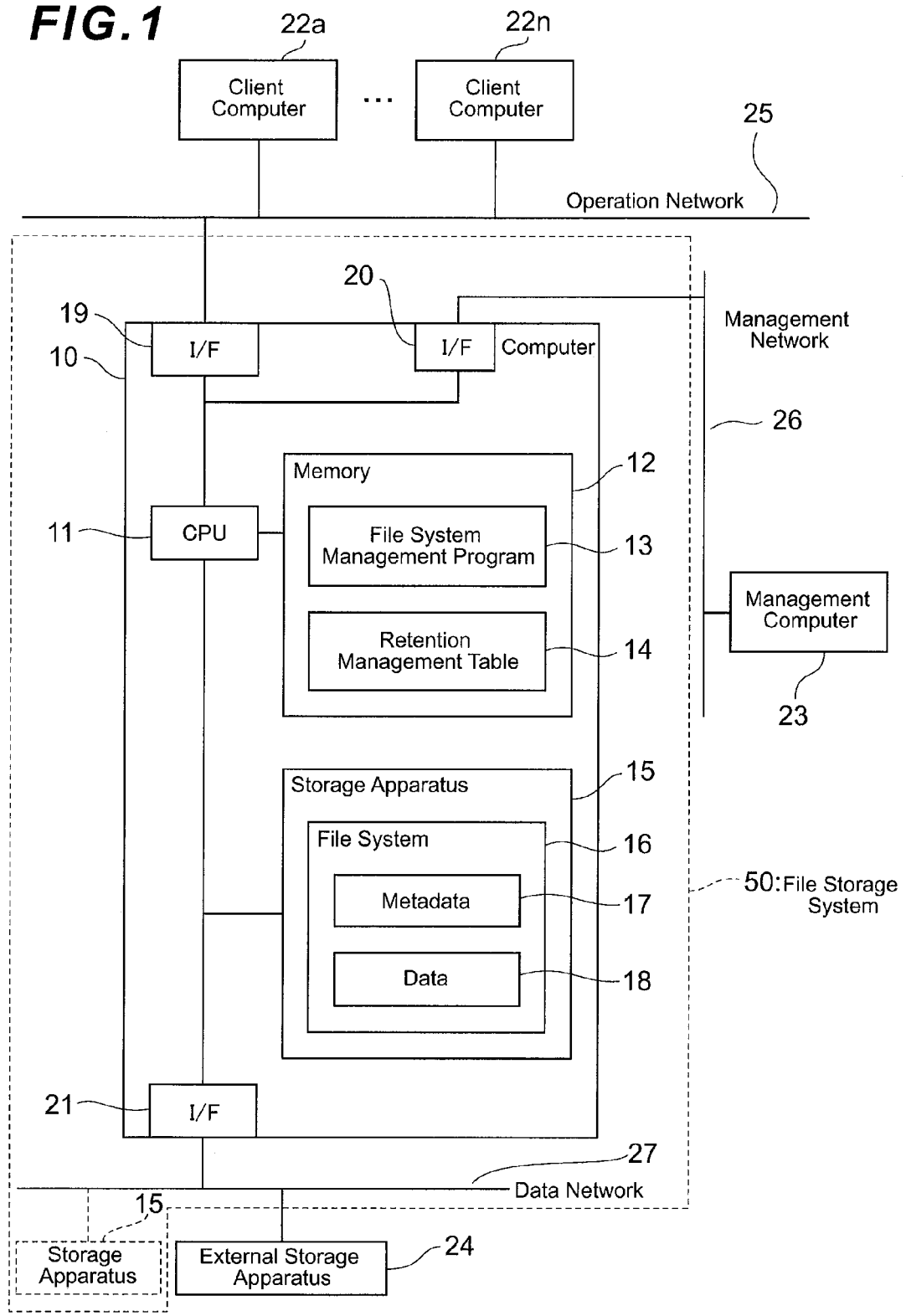
FIG. 1 is a block diagram showing the configuration of a basic computer system according to the present invention.

Embodiments of the present invention will be explained below with reference to the attached drawings.
[Basic Configuration]
FIG. 1 shows the outline of a basic computer system according to this invention.

A computer 10 is constituted from a CPU 11, a memory 12, a storage apparatus 15, an operation network interface (hereinafter referred to as the "operation I/F") 19, a management network interface (hereinafter referred to as the "management I/F") 20, and a data interface (hereinafter referred to as the "data I/F") 21. The operation I/F 19 is connected via an operation network 25 to client computers 22a to 22n, the management I/F 20 is connected via a management network 26 to a management computer 23, and the data I/F 21 is connected via a data network 27 to an external storage apparatus 24.

The memory 12 stores a file system management program 13 and a retention management table 14, and the storage apparatus 15 stores one or more file systems 16 including a plurality of files.

The CPU 11 is configured as a processor for executing the file system management program 13, referring to the retention management table 14, and managing the file system(s) 16 based on the reference result.

The file system management program 13 has a function executing processing on the file system(s) 16. For example, the file system management program 13 executes processing for creating the file system 16 to be stored in the storage apparatus 15 by logically dividing a physical storage area of the storage apparatus 15 or the external storage apparatus 24 and processing for deleting the file system 16. The file system management program 13 also executes processing for creating, updating, or deleting files or directories stored in the file system 16.

The file system 16 is a data structure storing files and directories created by the computer 10. The file system 16 has metadata 17 and file data 18. The file data 18 is data of each file stored in the file system 16. The metadata 17 is information, other than the file data 18, about each file stored in the file system 16, such as a date and time of creation of each file and an owner of each file.

The storage apparatus 15 can be constituted from storage media having, in addition to the function storing data about the file system 16, a function reading/writing data from/to the file system 16 in response to access from the CPU 11. Furthermore, storage media constituting the storage apparatus 15, for example, media for storing data about the file system 16 may be hard disk drives or other media such as flash media.

The external storage apparatus 24 is a device that has storage media (not shown in the drawing) for storing data, is connected via the data network 27 to the computer 10, and reads/writes data stored in the storage media. The storage media for storing data may be hard disk drives or other media such as flash media. Incidentally, the storage apparatus 15 for storing the file system 16 may exist outside the computer 10 (that is, in the external storage apparatus 24). In a more preferred embodiment of this case, data is read/written from/ to the storage apparatus 15 according to block I/O protocol represented by, for example, SCSI protocol. Incidentally, the storage apparatus 15 may be included in the computer 10, or exist outside the computer 10, or exist both inside and outside the computer. Incidentally, if the storage apparatus 15 exists outside the computer 10, the computer 10 and the storage apparatus 15 may sometimes be referred to as a "file storage system 50."

The client computers 22a to 22n (hereinafter sometimes referred to as the "client computer 22") give a command to read/write data from/to the computer 10 via the operation network 25 connected to the operation I/F 19. When this happens, the computer 10 which has received the read/write command executes processing for writing data to the file system 16 or processing for reading data from the file system 16 and sends each processing result to the client computer 22.

The management computer 23 manages the computer 10 by sending/receiving a command relating to each of various programs in the memory 12 to/from the computer 10 via the management network 26 connected to the management I/F 20.

A preferred example of the operation network 25, the management network 26, and the data network 27 may be a LAN (Local Area Network) or a SAN (Storage Area Network), but other forms of network may be used.

Incidentally, information relating to this invention will be explained below with regard to, for example, tables by using expressions such as the "retention management table 14." However, these pieces of information may be expressed by forms other than the data structure such as tables. Accordingly, the "tables" or the like may be simply called "information" in order to show no dependence on the data structure.

Also, expressions such as "identification information," "identifier," "name," or "ID" will be used when explaining the details of each piece of information. However, these expressions can be replaced with one another.

Furthermore, a "program" may be sometimes used as a subject in an explanation below. Since a program is executed by a processor to execute certain processing by using a memory and a communication port (communication control device), the processor may be used as a subject in an explanation. Moreover, processing disclosed by using a program as a subject may be processing executed by a computer such as a management server, or an information processing device. Furthermore, some or all the programs may be realized by dedicated hardware.

Various programs may be installed in each computer by using a program distribution server or storage media.

Incidentally, the management computer 23 has input-output devices. Examples of the input-output devices may include a display, a keyboard, and a pointer device, but may be other devices. Also, instead of using the above-mentioned input-output devices for input and display purposes, a serial interface or an Ethernet interface may be used as the input-output device, a display computer having a display, a keyboard, or a pointer device may be connected to the interface, and display information may be displayed on the display computer which may be used to accept inputs.

FIG. 2 shows an example of the retention management table 14. The retention management table 14 includes at least a "file system name" field 141, a "WORM" attribute field 142, a "retention period end date and time" field 143, and a "counter" field 144.

The file system name 141 is an identifier for identifying a file system and may be a letter string or other numbers. The WORM attribute 142 is an attribute indicating whether the relevant file system is WORM or not. The retention period end date and time 143 is the furthest future retention period end date and time along a time axis from among retention period end dates and times of files included in the file system and is managed as a deletion prohibition end date and time of the file system by the file system management program 13.

Accordingly, when a deletion request is made to delete a certain file system, the file system management program 13 refers to the retention management table 14 and can delete the file system to be deleted on condition that, for example, the current time when the deletion request is made or scheduled deletion time is after the deletion prohibition end date and time of the file system to be deleted.

The counter 144 is the number of files, from among those belonging to each file system, whose retention period end date and time belongs to the retention period end date and time 143 in the retention management table 14, that is, whose retention period end date and time is the deletion prohibition end date and time of the file system.

Incidentally, in this embodiment, the retention management table 14 is located in the memory 12 separately from the file system, but the WORM attribute 142, the retention period end date and time 143, and the counter 144 of a file system may be located in part of areas in the file system identified by the file system name 141.

Figures 3, 4:
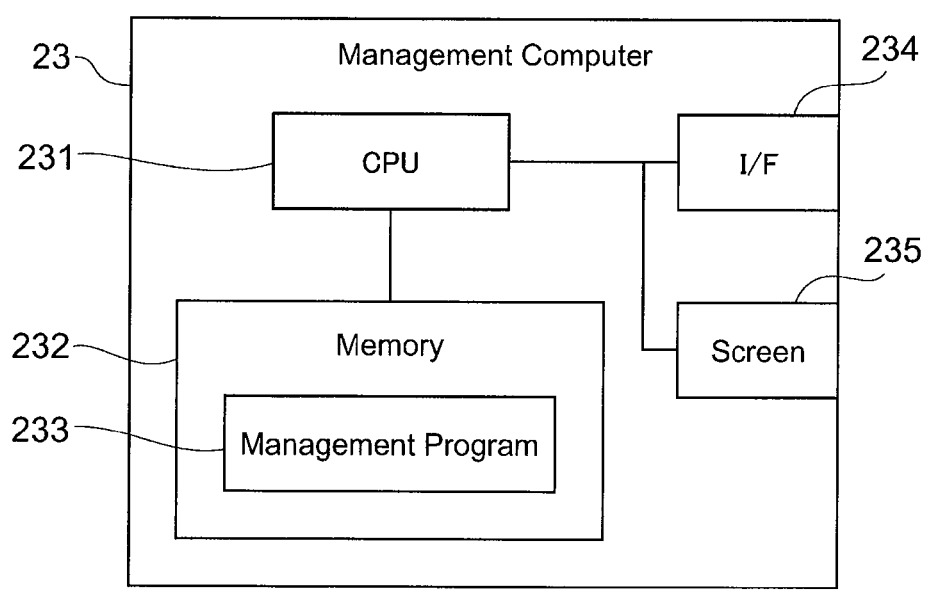
FIG. 3 is a configuration diagram showing the configuration of metadata.
FIG. 4 is a block diagram showing the configuration of a management computer.

FIG. 3 shows an example of the metadata 17. One entry in the metadata 17 represents one file. The metadata 17 of each file includes at least an i-node number 171 and a retention period end date and time 172. The i-node number 171 is a unique number for identifying one file in each file system. The retention period end date and time 172 is information given to each file as an attribute of prohibiting deletion of each file until its retention period end date and time passes.

As a result, if a deletion request is made to delete a certain file system, the file system management program 13 refers to the metadata 17 of the file to be deleted as designated by the deletion request; and the file system management program 13 can delete the file to be deleted on condition that, for example, the current time when the deletion request is made or scheduled deletion time is after the retention period end date and time of the file to be deleted.

Incidentally, values shown in the tables in FIGS. 2 and 3 are examples.

A flag to which the CPU 11 can refer is given to each file system 16 and a plurality of files belonging to each file system 16.

FIG. 4 is a block diagram showing the configuration of the management computer 23. The management computer 23 is constituted from a CPU 231, a memory 232, a network interface 234, and a screen 235. The screen 235 is configured as a display screen for a display device (not shown in the drawing) located in the management computer 23. Incidentally, a display device for displaying, for example, processing results of the CPU 11 and information from the management computer 23 may be placed on the computer 10 and a display screen for this display device may be used as the screen 235.

The memory 232 stores a management program 233 and the management computer 23 executes the management program 233, using the CPU 231. Incidentally, the management program 233 may be configured as a program that operates on the CPU 11 for the computer 10, and may be stored in the memory 12. Also, the screen 235 may be configured as a display screen for the computer 10.

FIG. 5 shows an example of a GUI (Graphical User Interface) displayed on the screen 235 for the management computer 23 when creating a file system. The GUI includes at least an interface 2351 for inputting a file system name and an interface 2352 for selecting whether the WORM attribute should be made valid or not.

Moreover, a GUI according to the third embodiment described later includes an interface 2354 for inputting a backup apparatus and an interface 2355 for inputting media to be used for backup.

Furthermore, a GUI according to the fourth embodiment described later includes an interface 2356 for inputting a cache computer for caching backup data of the file system 16.

The GUI may also include, for example, an interface 2353 for inputting the capacity of the file system 16 to be created according to each embodiment.

Figure 6:
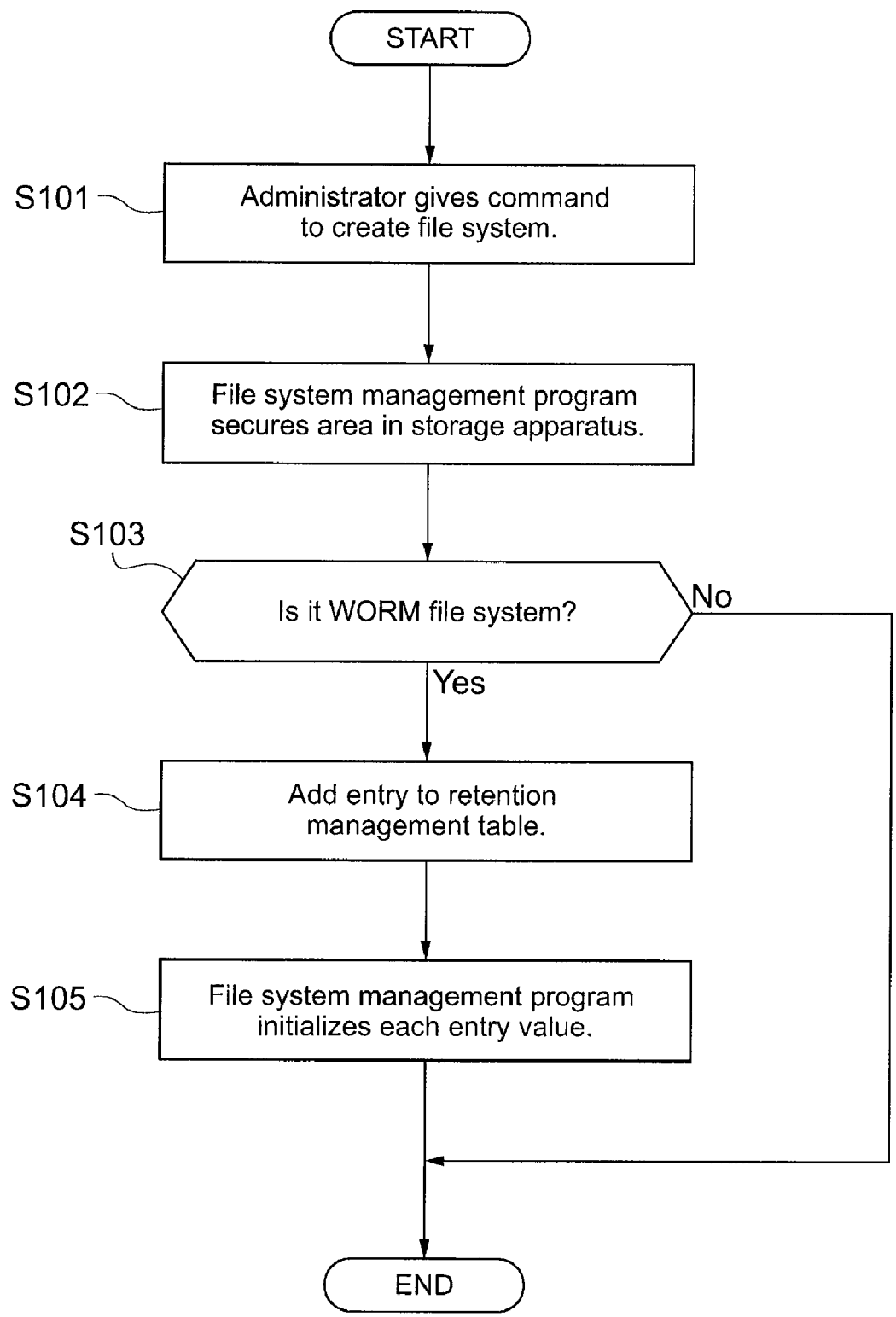
FIG. 6 is a flowchart illustrating a processing sequence for creating a file system.

FIG. 6 is a flowchart illustrating a processing sequence for creating a file system 16 used in each embodiment.

When creating a file system 16 as shown in FIG. 6, an administrator first operates the management computer 23 and gives a command to the file system management program 13 to create the file system 16 with the WORM attribute (S101).

For example, the administrator inputs the file system name to the GUI shown in FIG. 5 and performs the operation to select "Yes" in the selection of whether the WORM attribute should be made valid or not.

After receiving the command from the administrator, the file system management program 13 formats a storage area in the storage apparatus 15 and creates the file system 16 (S102).

Next, if the administrator selects to make the WORM attribute valid (S103: Yes), the file system management program 13 adds an entry to the retention management table 14 (S104).

The file system management program 13 then initializes a value of the entry (S105). The file system name 141 and the WORM attribute 142 are set respectively according to the file system name and the WORM attribute which are input by the administrator to the GUI shown in FIG. 5. For example, regarding an entry in the retention management table 14, the file system name 141 stores "filesystem1" and the WORM attribute 142 stores "Yes."

The file system management program 13 then terminates the processing for creating the file system 16.

First Embodiment

This embodiment is designed so that when a file system with the WORM attribute is to be deleted, and if there is any file whose retention period end date and time has not expired yet, among files stored in that file system, processing for deleting the file system is stopped and the date and time when the file system can be deleted is displayed.

Specifically speaking, every time a file is added to the file system 16, the attribute of prohibiting deletion of each file until its retention period end date and time passes is given to each file; the files are managed using the retention management table 14 by setting the furthest future retention period end date and time of a file along a time axis among the retention period end dates and times of the files to be a deletion prohibition end date and time of the file system; and if a deletion request to delete the file system 16 is made, the current time when the deletion request is made is compared with the deletion prohibition end date and time of the file system 16 without searching all the files belonging to the file system 16; and if the deletion prohibition end date and time of the file system 16 is a future time ahead of the current time when the deletion request is made, processing for deleting the file system 16 is stopped and the deletion prohibition end date and time of the file system 16 is displayed on the screen 235.

Figure 7:
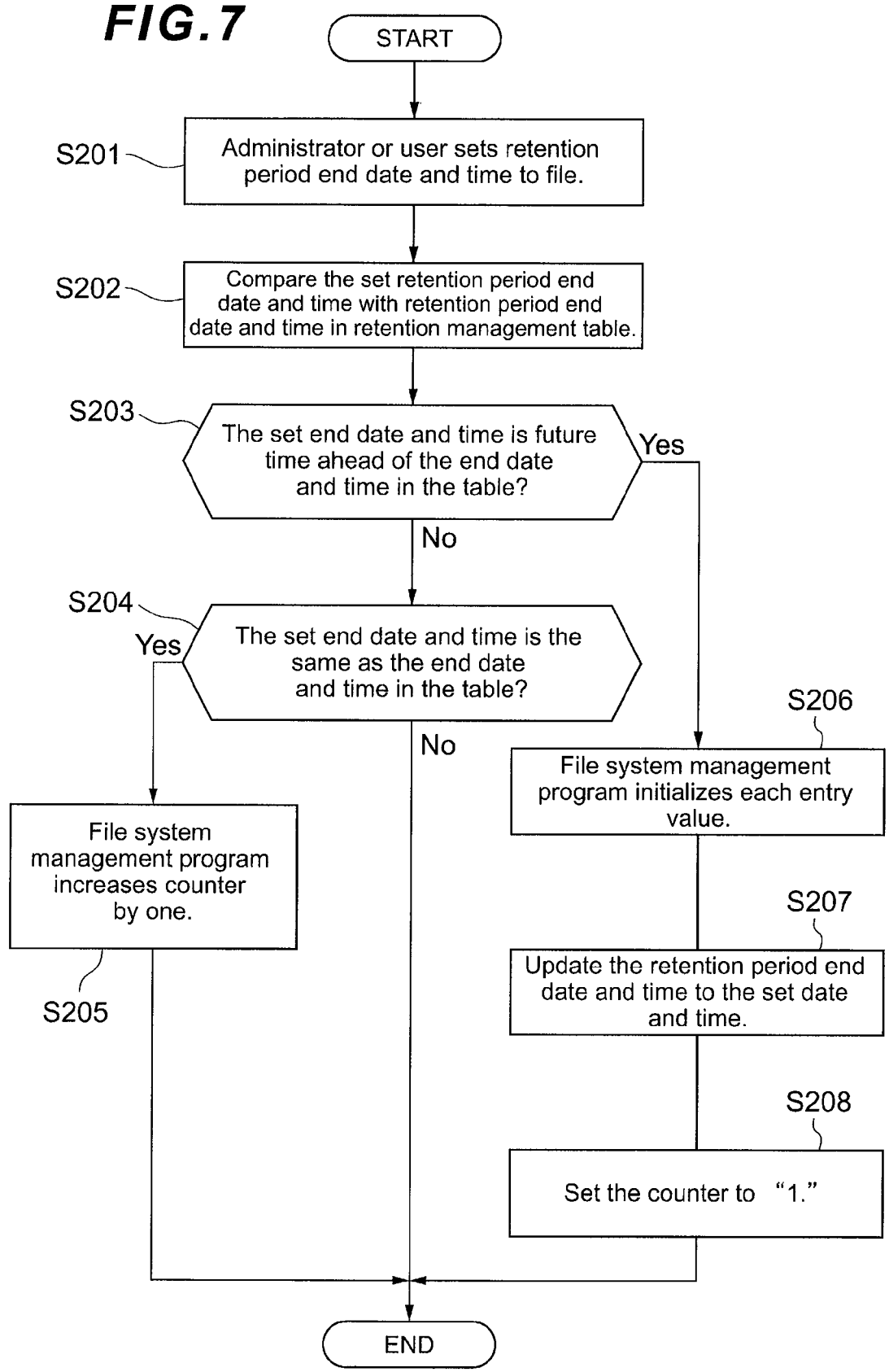
FIG. 7 is a flowchart illustrating a processing sequence for setting retention to a file in a WORM file system according to the first embodiment.

FIG. 7 is a flowchart illustrating a processing sequence for setting a retention period to a file stored in the file system with the WORM attribute according to this embodiment.

The administrator first operates the management computer 23 to select a file to which he/she wants to set a retention period; and then the administrator gives a command to the file system management program 13 to set the retention period to the selected file (S201). In this case, a general user may use the client computer 22 to select a file, to which he/she wants to set a retention period, and then give a command to set the retention period to the selected file. As the retention period setting method besides the setting method by using the management program 233, a method of setting access time of the relevant file to a retention period end date and time may be used.

After receiving the command to set the retention period, the file system management program 13 compares the retention period end date and time 143 of the file system 16, which includes the target file, from among the file systems 16 included in the retention management table 14 with the last day of the retention period set by the administrator or the general user (that is, the retention period end date and time of that file) (S202).

If the retention period end date and time set by the administrator or the general user is a future time ahead of the retention period end date and time 143 in the retention management table 14 (S203: Yes), the file system management program 13 judges that the relevant file is a file with the furthest future retention period end date and time among the file system 16. In this case, the following procedures of S206 to S208 will be performed in order to update the retention period end date and time 143 of the file system 16.

Firstly, the file system management program 13 selects the entry of that file system 16 from the retention management table 14 and initializes the value of the selected entry (S206).

Next, the file system management program 13 overwrites the retention period end date and time 143 of the selected entry with the retention period end date and time set by the administrator or the general user (S207).

Subsequently, the file system management program 13 sets the counter 144 of the selected entry to "1" (S208) and then terminates the processing.

Meanwhile, if it is determined in step S203 that the retention period end date and time set by the administrator or the general user is not a future time ahead of the retention period end date and time 143 in the retention management table 14, the retention period end date and time 143 of the file system 16, the file system management program 13 then judges whether or not the set retention period end date and time is the same time as the retention period end date and time set by the administrator or the general user (S204)

If the file system management program 13 determines that the retention period end date and time 143 of the file system 16 is the same as the retention period end date and time set by the administrator or the general user (Yes), it selects the entry of that file system from the retention management table 14 and increases the counter 144 value in that entry by "1," thereby terminating the processing (S205).

If the file system management program 13 determines in S204 that the retention period end date and time set by the administrator or the general user is a past time before the retention period end date and time 143 in the retention management table 14 (No), the retention period end date and time set to that file will not influence the retention period end date and time of the entire file system 16 and, therefore, the file system management program 13 terminates the processing.

When setting the retention period to each file every time a file is added to the file system 16, the file system management program 13 gives each file the retention period end date and time as the attribute of prohibiting deletion of the file until the retention period end date and time passes (or until the retention period end date and time expires) as described above.

When giving such an attribute to the first file, the file system management program 13 gives this file the retention period end date and time and also sets this retention period end date and time to be the deletion prohibition end date and time of the file system 16 to the retention period end date and time 143 in the retention management table 14 and sets the counter 144 in the retention management table 14 to "1."

Subsequently, every time a file is added to the file system 16, the file system management program 13 gives each file the retention period end date and time, compares this retention period end date and time with the retention period end date(s) and time(s) of the already-added file(s), and updates the retention period end date and time 143 in the retention management table 14 by setting the furthest future retention period end date and time along a time axis to be the deletion prohibition end date and time of the file system 16; and every time the number of files to which the same retention period end date and time as the retention period end date and time 143 is given increases, the file system management program 13 increases the number of the counter 144 in the retention management table 14.

Figure 8:
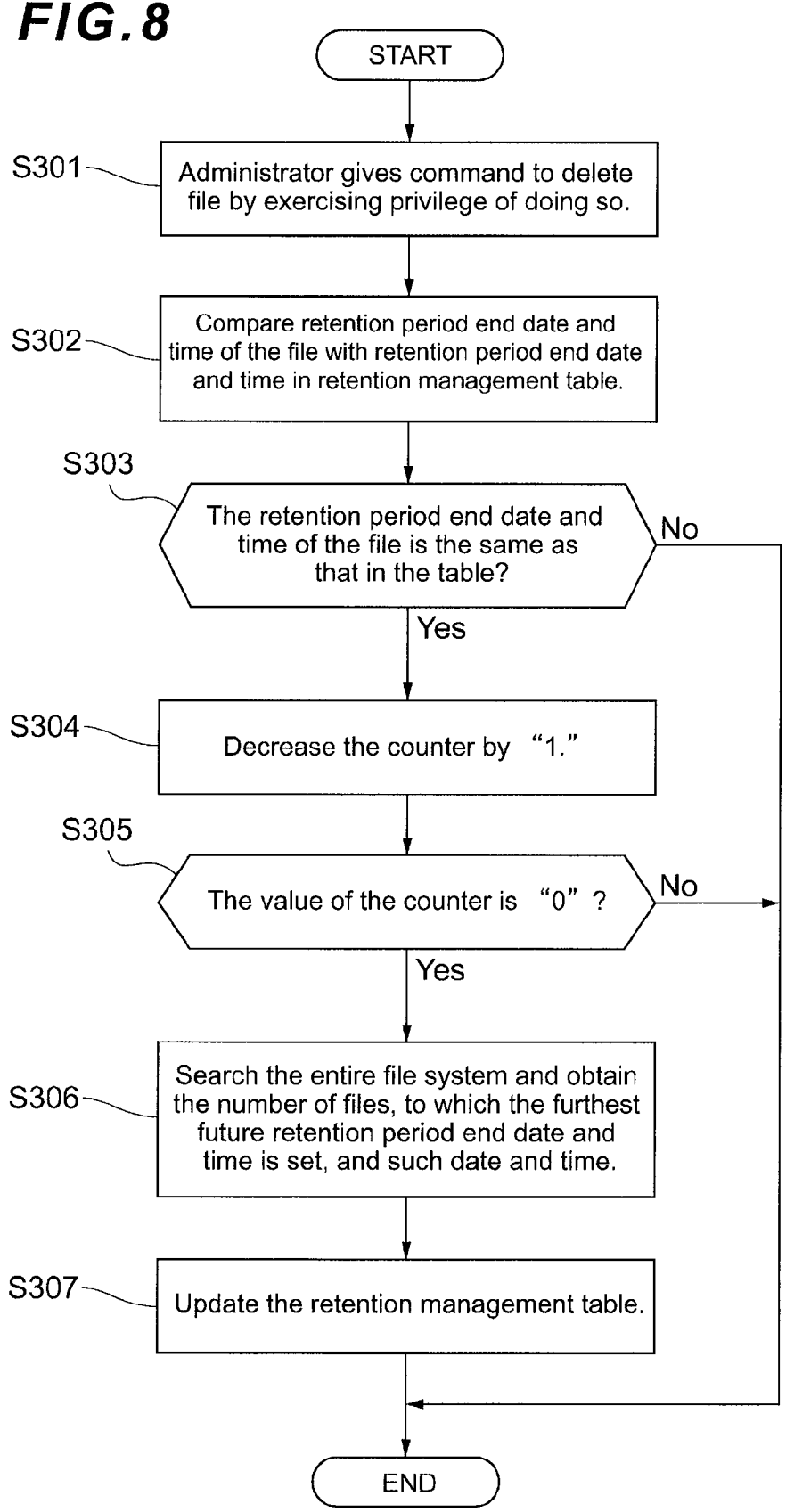
FIG. 8 is a flowchart illustrating a processing sequence for deleting a file in the WORM file system by exercising a privilege of doing so according to the first embodiment.

FIG. 8 is a flowchart illustrating a processing sequence for deleting a file which is stored in a file system with the WORM attribute and to which the retention period is set, by exercising a privilege of doing so. The processing for deleting a file by exercising the privilege of doing so herein means processing for deleting a file to which the retention period is set, on condition that, for example, the account name of a specific administrator is input.

The administrator first operates the management computer 23 to select a file that he/she wants to delete (the file to be deleted), and then gives a command to the file system management program 13 to delete the selected file to be deleted by exercising the privilege of doing so (S301). In this case, a general user may use the client computer 22 to select a file that he/she wants to delete, and give a command to delete the selected file to be deleted by exercising the privilege of doing so.

Next, the file system management program 13 selects the entry of the file system 16 from the retention management table 14, selects the file to be deleted from files belonging to the file system 16 of the selected entry, compares the retention period end date and time of the selected file to be deleted with the retention period end date and time 143 in the retention management table 14 (S302), and judges whether or not the retention period end date and time of the selected file to be deleted is the same as the retention period end date and time 143 in the retention management table 14 (S303).

If the file system management program 13 determines in step S303 that the retention period end date and time of the selected file to be deleted is not the same as the retention period end date and time 143 in the retention management table 14 (No), the retention period end date and time of the selected file to be deleted will not influence the retention period end date and time 143 of the entire file system and, therefore, the file system management program 13 terminates the processing in this routine.

If the file system management program 13 determines in step S303 that the retention period end date and time of the selected file to be deleted is the same as the retention period end date and time 143 in the retention management table 14 (Yes), the file system management program 13 decreases the value of the counter 144 in the retention management table 14 by "1"(S304), and then judges whether the value of the counter 144 in the retention management table 14 is "0" or not (S305).

If the file system management program 13 determines that the value of the counter 144 in the retention management table 14 is not 0 (No), reduction of the counter 144 value by "1" will not influence the retention period end date and time 143 of the entire file system if the counter 144 value is "1" or more. Therefore, the file system management program 13 shifts to the processing for deleting the file to be deleted and terminates the processing in this routine.

On the other hand, if he file system management program 13 determines in S305 that the counter 144 value in the retention management table 14 is "0" (Yes), that is, the counter 144 value becomes "0" as a result of reduction of the counter 144 value by "1," that counter 144 value will influence the retention period end date and time of the entire file system and, therefore, the file system management program 13 executes processing for searching all the files existing in the file system 16 (S306).

For example, the file system management program 13 searches all the plurality of files stored in the file system 16 and then obtains the number of files, from among the plurality of the searched files, to which the furthest future retention period end date and time is set, and the retention period end date and time of such files.

Next, the file system management program 13 selects the entry of that file system 16 from the retention management table 14, updates the retention management table 14 by setting the retention period end date and time and the number of files obtained in S306 to the retention period end date and time 143 and the counter 144 for the file system 16 of the selected entry (S307), and then terminates the processing in this routine.

Incidentally, the file system management program 13 can also execute processing for displaying, on the screen 235, the retention period end date and time 143 and the number of newly obtained files in the updated retention management table 14. In this case, the administrator can recognize the update content by watching the screen 235.

Figure 9:
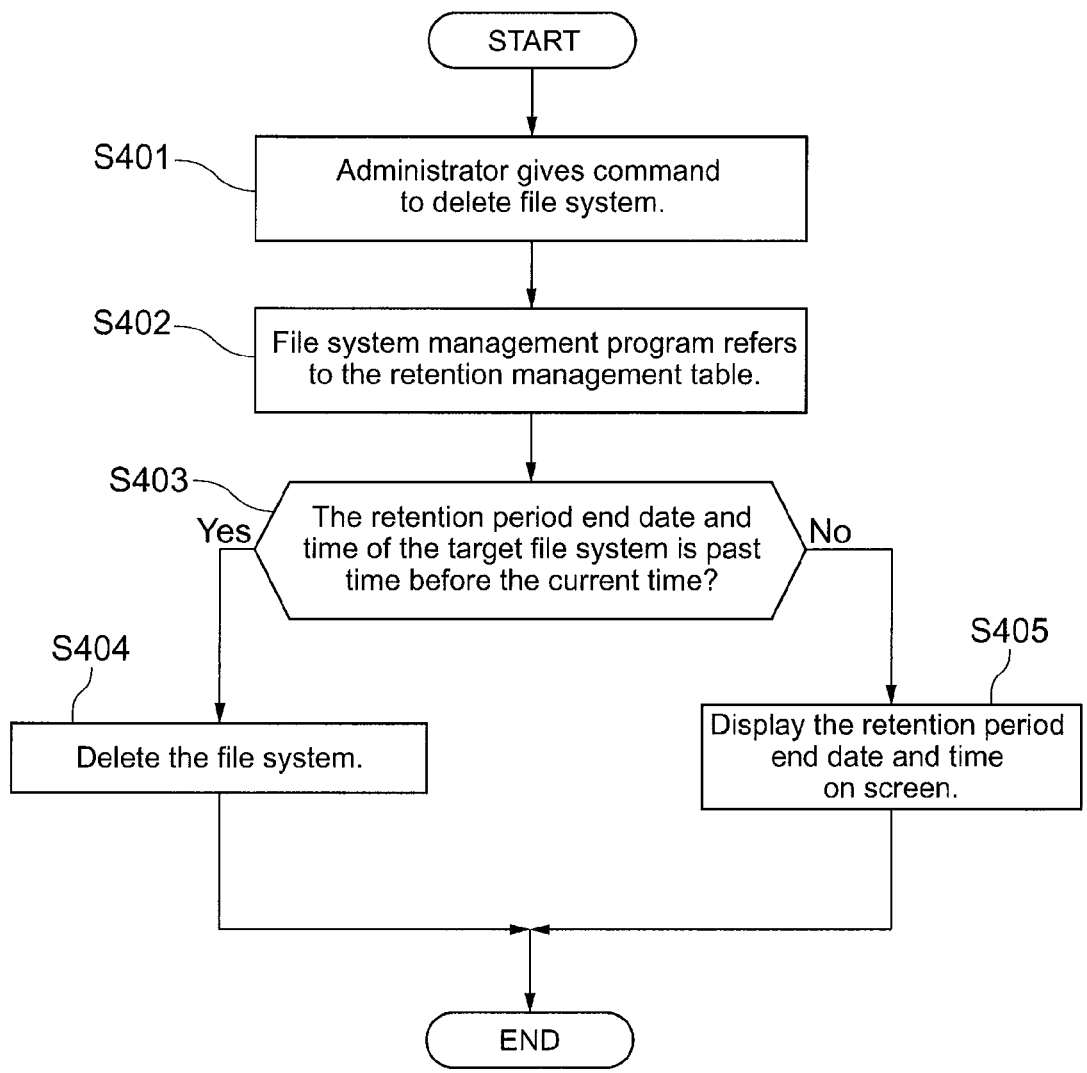
FIG. 9 is a flowchart illustrating a processing sequence for deleting the WORM file system according to the first embodiment.

FIG. 9 is a flowchart illustrating a processing sequence for deleting a file system according to this embodiment.

The administrator first operates the management computer 23 to selects a file system that he/she wants to delete (the file system to be deleted) 16 and gives a command to the file system management program 13 to delete the selected file system to be deleted 16 (S401).

Next, in response to the deletion request from the management computer 23, the file system management program 13 refers to the retention management table 14 and obtains the entry of the file system to be deleted 16 (S402).

Then, the file system management program 13 compares the retention period end date and time 143 of the obtained entry, i.e., the retention period end date and time 143 of the file system to be deleted 16, with the current time when the deletion request is made, and judges whether or not the retention period end date and time 143 of the file system to be deleted 16 is a past time before the current time when the deletion request is made (S403).

If the file system management program 13 determines that the retention period end date and time 143 of the file system to be deleted 16 is a past time before the current time when the deletion request is made (Yes), the file system management program 13 recognizes that the retention period of the file system to be deleted 16 has expired, deletes the file system to be deleted 16, and terminates the processing in this routine (S404).

On the other hand, if it is determined that the retention period end date and time 143 of the file system to be deleted 16 is not a past time before the current time when the deletion request is made (No), that is, the retention period end date and time 143 of the file system to be deleted 16 is a future time ahead of the current time when the deletion request is made, the file system management program 13 recognizes that the retention period of the file system to be deleted 16 has not expired yet, has the screen 235 display the retention period end date and time 143 of the file system to be deleted 16 (S405), and then terminates the processing in this routine.

As a result, the administrator can recognize by watching the displayed content of the retention period end date and time 143 that the file system to be deleted 16 cannot be deleted until the retention period end date and time.

Figure 10:
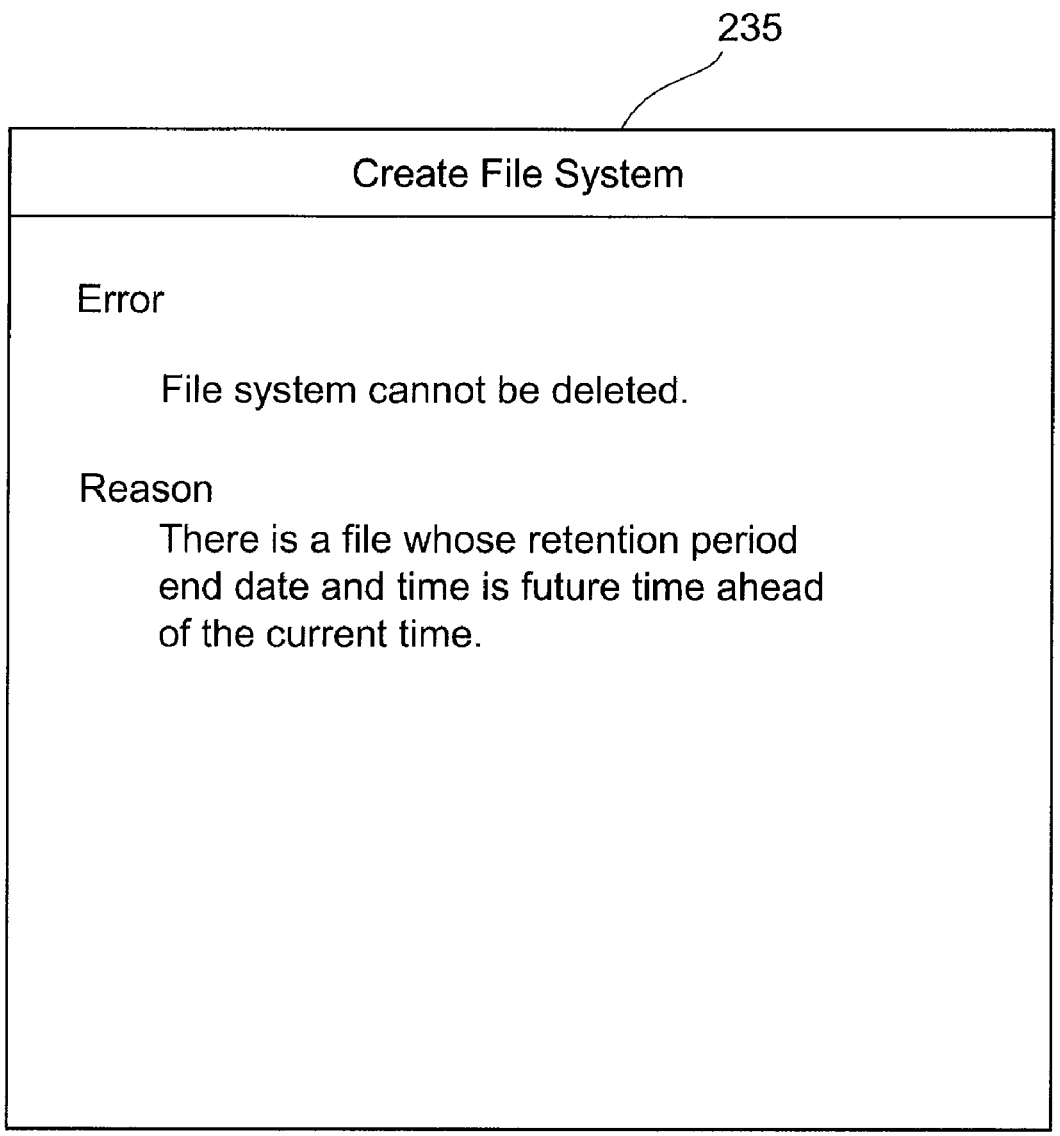
FIG. 10 shows an example of display of an error message on a screen for the management computer.

Incidentally, in step S405, the file system management program 13 can have the screen 235 for the management computer 23 or the display device for the computer 10 display an error message as shown in FIG. 10.

As a result of the above-described processing, the file system management program 13 can judge, without searching all the files stored in the file system to be deleted, whether the retention periods of all the files stored in the file system to be deleted have expired or not, by checking whether or not the retention period end date and time 143 of the file system to be deleted 16 is a past time before the current time when the deletion request is made. Therefore, the file system management program 13 can execute the processing for deleting the file system to be deleted 16 at high speed.

Furthermore, the administrator can quickly recognize the date and time when it becomes possible to delete the file system to be deleted.

Second Embodiment

This embodiment is designed so that when a file system with the WORM attribute is to be deleted as the file system to be deleted, if there is any file, among files stored in the file system to be deleted, whose retention period end date and time has not come to the retention period end date and time of the file system to be deleted, the processing for deleting the file system to be deleted is stopped and the name of a file with the furthest future retention period end date and time is displayed. Elements used in this embodiment are similar to those used in the first embodiment.

Specifically speaking, according to this embodiment, a plurality of files belonging to the file system 16 with the WORM attribute are managed by dividing the files into a plurality of groups by their retention period end dates and times and associating each file belonging to each group with the name of that file; if the retention period end date and time of the file system to be deleted 16 is a future time ahead of the current time when the deletion request is made, processing for deleting the file system to be deleted 16 is stopped and the name of each file belonging to a group with the furthest future retention period end date and time along a time axis from among the plurality of groups is displayed on the screen 235.

FIG. 11 is an example of a retention management table 14A used in this embodiment. The retention management table 14A includes a "file system name" field 141, a "WORM" attribute field 142, a "retention period end date and time" field 143, and a "file name" field 145. The retention management table 14A has the file name 145 instead of the counter 144 in the retention management table 14 shown in FIG. 2 and is stored in the memory 12.

Specifically speaking, the retention management table 14A has the same configuration as that of the retention management table 14 with regard to the file system name 141, the WORM attribute 142, and the retention period end date and time 143; and the file name 145 stores the file names of files stored in the file system corresponding to each entry.

Figure 12:
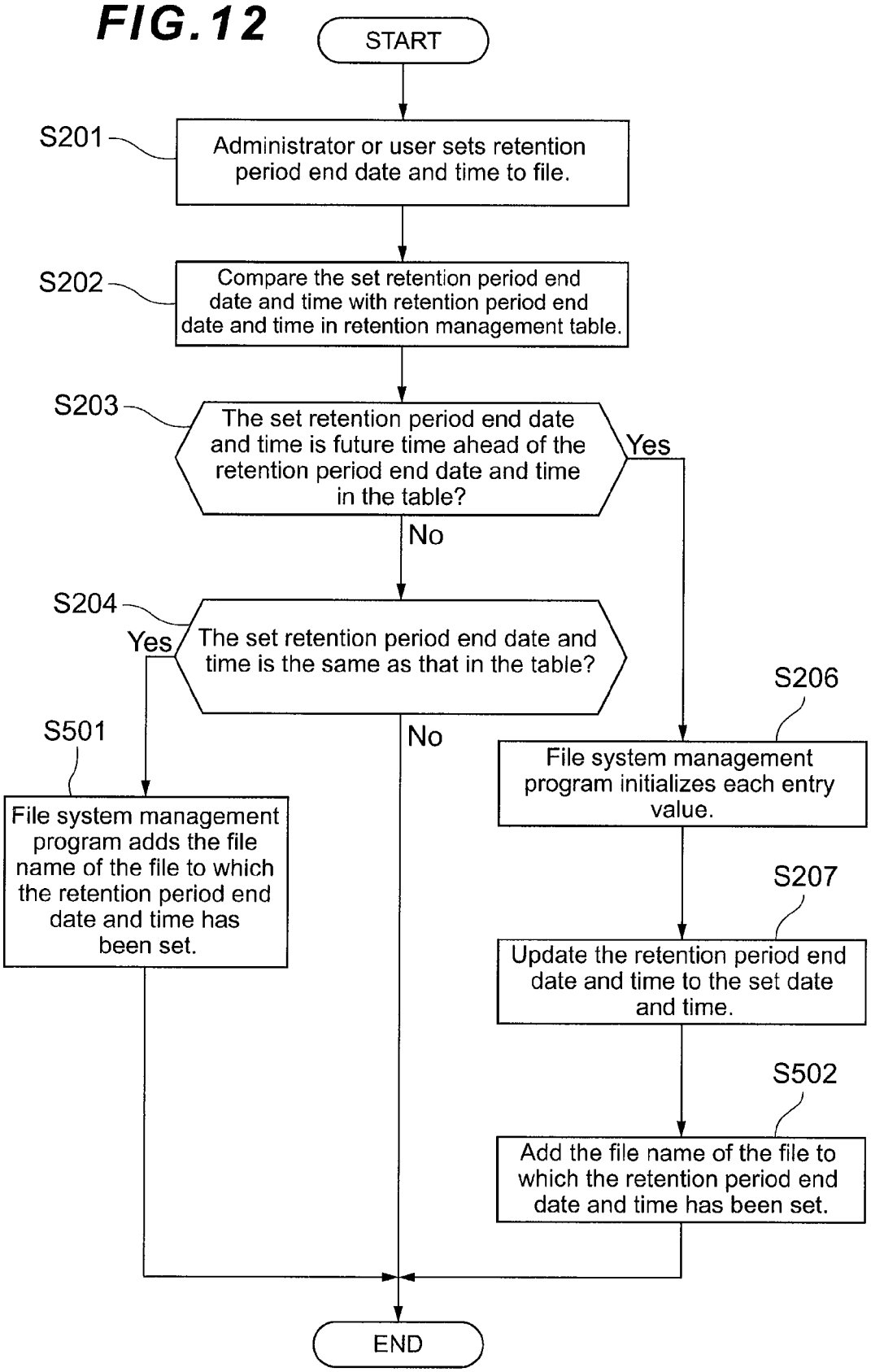
FIG. 12 is a flowchart illustrating a processing sequence for setting retention to a file in a WORM file system according to the second embodiment.

FIG. 12 is a flowchart illustrating a processing sequence for setting the retention period to a file stored in a file system with the WORM attribute according to this embodiment.

This processing sequence is almost the same as the processing sequence for setting the retention period to a file stored in a file system with the WORM attribute according to the first embodiment (FIG. 7), and the processing sequence according to this embodiment is realized by replacing S205 and S208 in the processing sequence in FIG. 7 with S501 and S502, respectively.

Specifically, in S501 as processing to be executed after it is determined that the retention period end date and time 143 of the file system to be deleted 16 is the same time as the retention period end date and time set by the administrator or the general user, the file system management program 13 selects the entry of the file system to be deleted 16 from the retention management table 14A and adds the file name of files belonging to the file system to be deleted 16 in the selected entry to the file name 145 of the selected entry.

On the other hand, S502 as processing to be executed after overwriting the retention period end date and time 143 of the selected entry with the retention period end date and time set by the administrator or the general user, the file system management program 13 adds the file names of files, to which the retention period end date and time has been set, to the file name 145 in the entry selected in S206.

Incidentally, a general file system can change the file name, so there is a possibility that the content of the retention management table 14A might be different from the content of the actual file system. In this case, just the simple processing shown in S502 would be insufficient.

However, since the file system 16 has the WORM attribute in this embodiment, there is no possibility that the file name will be changed. Therefore, the processing in S502 is sufficient. As a result, it is possible to realize high-speed processing.

Figure 13:
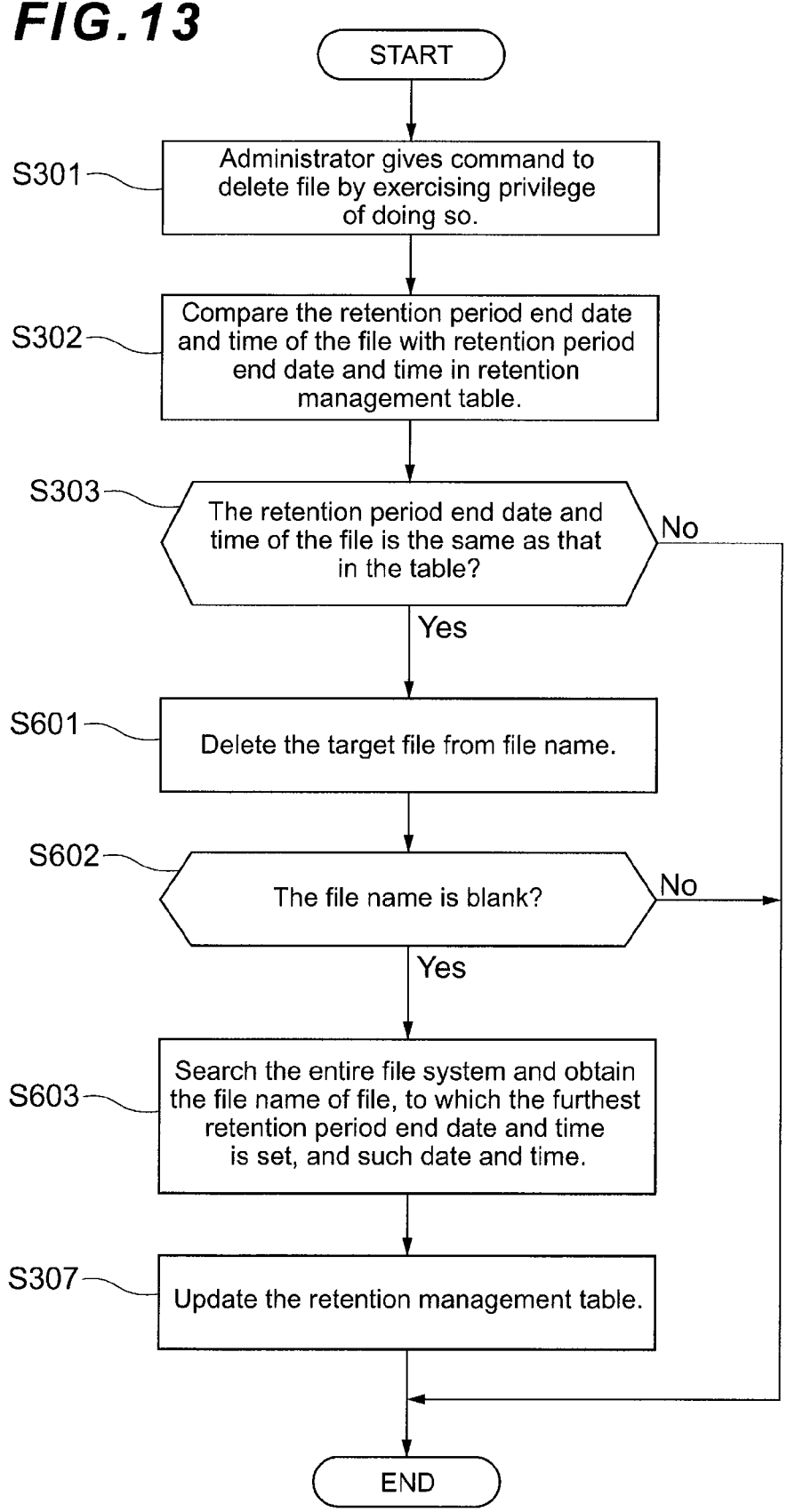
FIG. 13 is a flowchart illustrating a processing sequence for deleting a file in the WORM file system by exercising a privilege of doing so according to the second embodiment.

FIG. 13 is a flowchart illustrating a processing sequence for deleting a file, which is stored in a file system with the WORM attribute and to which the retention period is set, by exercising a privilege of doing so according to this embodiment.

This processing sequence is almost the same as the processing sequence for deleting a file, which is stored in a file system with the WORM attribute and to which the retention period is set, by exercising a privilege of doing so according to the first embodiment (FIG. 8), and the processing sequence according to this embodiment is realized by replacing S304, S305, and S306 in the processing sequence in FIG. 7 with S601, S602, and S603, respectively.

Specifically speaking, in S601 as processing to be executed after it is determined in step S303 that the retention period end date and time of the selected file to be deleted is the same as the retention period end date and time 143 in the retention management table 14A (Yes), the file system management program 13 deletes the file name 145 in the retention management table 14A; and in S602, the file system management program 13 judges whether the file name 145 field in the retention management table 14A is blank or not.

If it is determined in S602 that the file name 145 field in the retention management table 14A is not blank (No), and if deletion of one file name in the file name 145 field in the retention management table 14A results in one or more file names remaining in the file name 145 field in the retention management table 14A, that will not influence the retention period end date and time 143 of the entire file system to be deleted and, therefore, the file system management program 13 shifts to processing for deleting the file to be deleted and terminates the processing in this routine.

On the other hand, if it is determined in S602 that the file name 145 field in the retention management table 14A is blank (Yes), that is, deletion of one file name in the file name 145 field in the retention management table 14A results in a blank in the file name 145 field, that will influence the retention period end date and time 143 of the entire file system to be deleted and, therefore, the file system management program 13 executes processing for searching all the files existing in the file system to be deleted 16 (S603).

For example, the file system management program 13 searches all the files stored in the file system to be deleted 16 and obtains, from among the plurality of the searched files, the file name of a file, to which the second furthest future period end date and time after that of the already deleted file along the time axis is set, and the retention period end date and time of that file.

Next, the file system management program 13 selects the entry of the file system to be deleted from the retention management table 14A, updates the retention management table 14A by setting the retention period end date and time and the file name obtained in S603 to the retention period end date and time 143 and the file name 145, respectively, in the retention management table 14A for the file system 16 of the selected entry (S307), and then terminates the processing in this routine.

Incidentally, the file system management program 13 can also execute processing for displaying, on the screen 235, the retention period end date and time 143 and the file name of the newly obtained file in the updated retention management table 14A. In this case, the administrator can recognize the update content by watching the screen 235.

Figure 14:
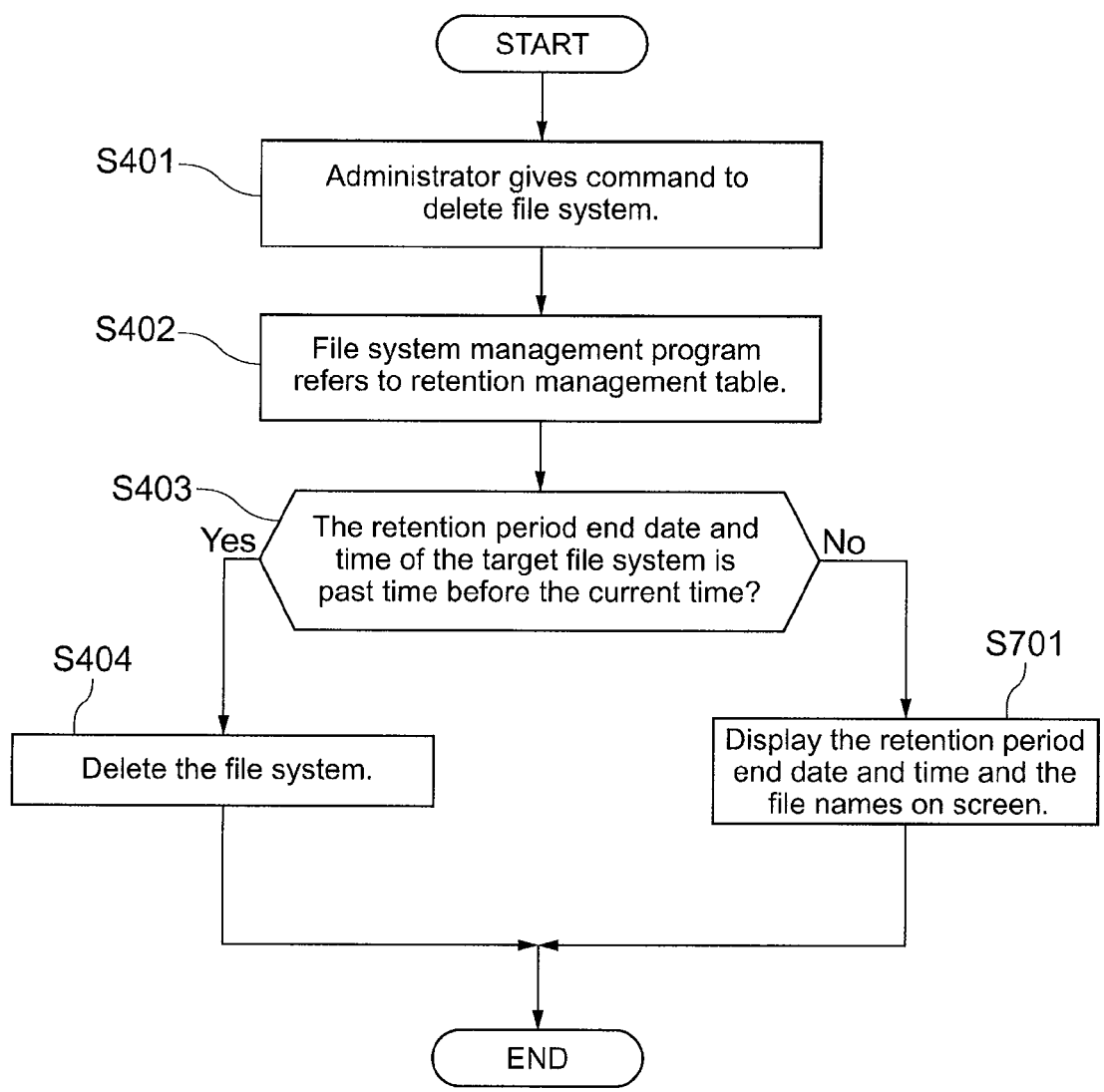
FIG. 14 is a flowchart illustrating a processing sequence for deleting the WORM file system according to the second embodiment.

FIG. 14 is a flowchart illustrating a processing sequence for deleting a file system according to this embodiment.

This processing sequence is almost the same as the processing sequence for deleting a file system according to the first embodiment (FIG. 9), and the processing sequence according to this embodiment is realized by replacing S405 in the processing sequence in FIG. 9 with S701.

Specifically speaking, in S701 as processing to be executed after it is determined that the retention period end date and time 143 of the file system to be deleted 16 is not a past time before the current time when the deletion request is made (No), that is, the retention period end date and time 143 of the file system to be deleted 16 is a future time ahead of the current time when the deletion request is made, the file system management program 13 recognizes that the retention period of the file system to be deleted 16 has not expired yet, has the screen 235 display the retention period end date and time 143 of the file system to be deleted 16 and the file names of files belonging to the file system to be deleted 16, and then terminates the processing in this routine.

As a result, the administrator can recognize, by watching the displayed content of the retention period end date and time 143 and the file names, that the file system to be deleted 16 cannot be deleted until the retention period end date and time, as well as the file names of the files belonging to the file system to be deleted 16.

As a result of the above-described processing, the file system management program 13 can judge, without searching all the files stored in the file system to be deleted, whether the retention periods of all the files stored in the file system to be deleted have expired or not, by checking whether or not the retention period end date and time 143 of the file system to be deleted 16 is a past time before the current time when the deletion request is made. Therefore, the file system management program 13 can execute the processing for deleting the file system to be deleted 16 at high speed.

Furthermore, the administrator can quickly recognize the date and time when it becomes possible to delete the file system to be deleted. The administrator can also recognize the file name of the file to which the furthest future retention period end date and time is set.

When this embodiment is compared with the first embodiment, this embodiment provides inferior memory capacity efficiency because of the necessity to store a list of file names, but enhances the convenience because of the more detailed content displayed for the administrator.

Third Embodiment

This embodiment is designed so that when deleting a file system with the WORM attribute as the file system to be deleted, a backup apparatus for backing up data in the file system to be deleted as backup data is notified that the retention periods of all the files in the file system to be deleted have expired, and the backup data of the file system to be deleted, which is stored in the backup apparatus, is deleted.

Specifically speaking, this embodiment relates to a computer system including a backup apparatus 28 connected via the data network 27 to the computer 10, and a backup server 34 for managing the backup apparatus 28, wherein the backup apparatus 28 stores data of the file system 16 stored in the storage apparatus 15 for the computer as backup data and manages the backup data in accordance with a command from the backup server 34.

If a deletion request to delete the file system to be deleted is made from the management computer 23 and the retention period end date and time of the file system to be deleted is a past time before the current time when the deletion request is made, the computer 10 deletes the file system to be deleted. When this happens, the backup server 34 gives a command to the backup apparatus 28 to delete the backup data corresponding to the file system to be deleted. The backup apparatus 28 deletes the backup data corresponding to the file system to be deleted in response to the command from the backup server 34.

Incidentally, when the deletion request to delete the file system to be deleted is made from the management computer 23, the computer 10 compares the current time when the deletion request is made with the retention period end date and time of the file system to be deleted; and if the retention period end date and time of the file system to be deleted is a future time ahead of the current time when the deletion request is made, the computer 10 has the screen 235 or the display device for the computer 10 display the retention period end date and time of the file system to be deleted, which is done in the same manner as in the first and second embodiments.

Figure 15:
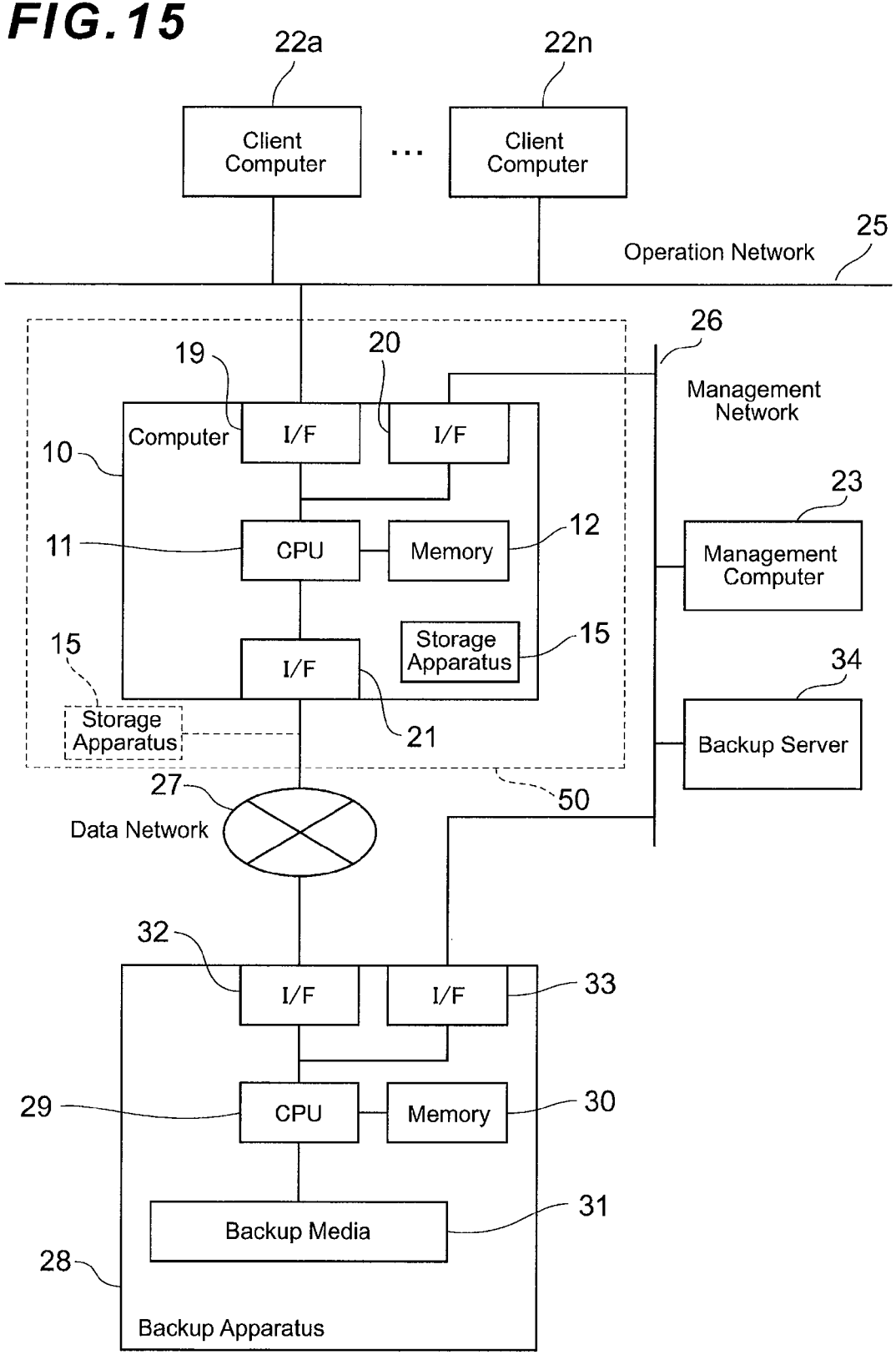
FIG. 15 is a block diagram showing the configuration of a computer system according to the third embodiment.

FIG. 15 shows a schematic diagram of a computer system according to this embodiment. This computer system is configured by adding the backup apparatus 28 and the backup server 34 to the basic computer system shown in FIG. 1.

The backup apparatus 28 in the computer system is constituted from a CPU 29, a memory 30, backup media 31, a data interface (hereinafter referred to as the "data I/F") 32, and a management network interface (hereinafter referred to as the "management I/F") 33. The data I/F 32 is connected via the data network 27 to the I/F 21 for the computer 10, and the management I/F 33 is connected via the management network 26 to the management computer 23 and the backup server 34.

The CPU 29 executes programs stored in the memory 30, sends/receives information to/from the computer 10 via the data network 27, and sends/receives information to/from the management computer 23 and the backup server 34 via the management network 26. Preferred examples of the backup media 31 include HDDs (Hard Disk Drives) and tape media.

Figure 16:
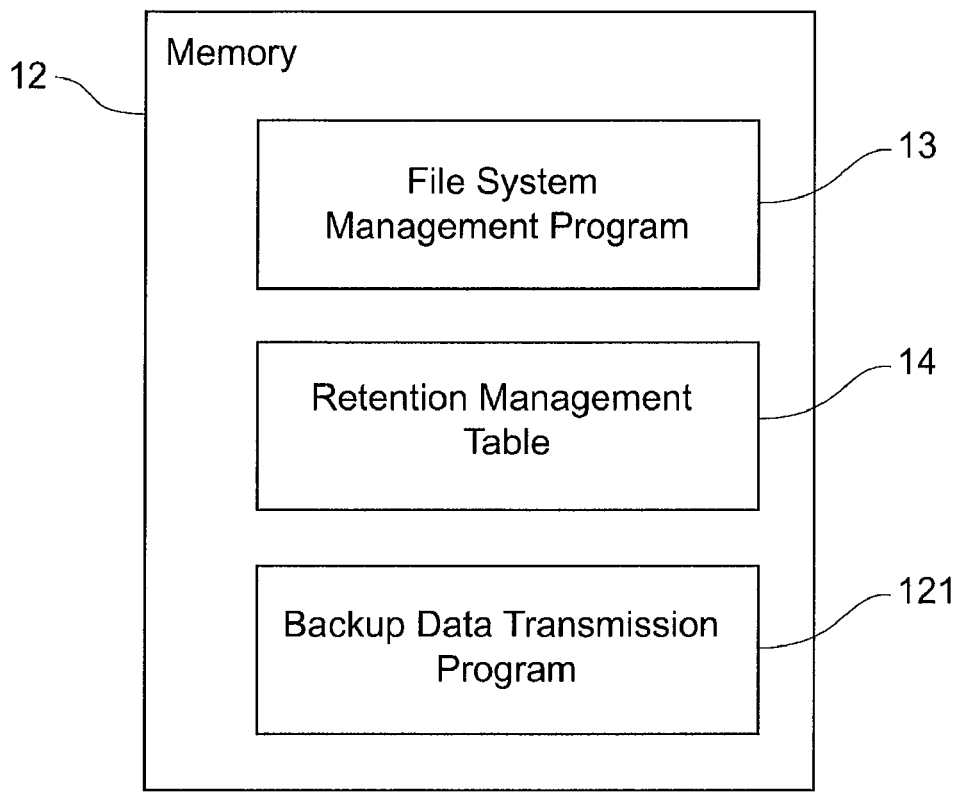
FIG. 16 is a block diagram showing the configuration of a memory for a computer according to the third embodiment.

FIG. 16 is a block diagram showing the configuration of a memory 12 for the computer 10. The memory 12 stores a backup data transmission program 121 in addition to the file system management program 13 and the retention management table 14. The computer 10 executes the file system management program 13 and the backup data transmission program 121 by using the CPU 11, and sends data about the file system 16 stored in the storage apparatus 15 as backup data to the backup apparatus 28.

Figure 17:
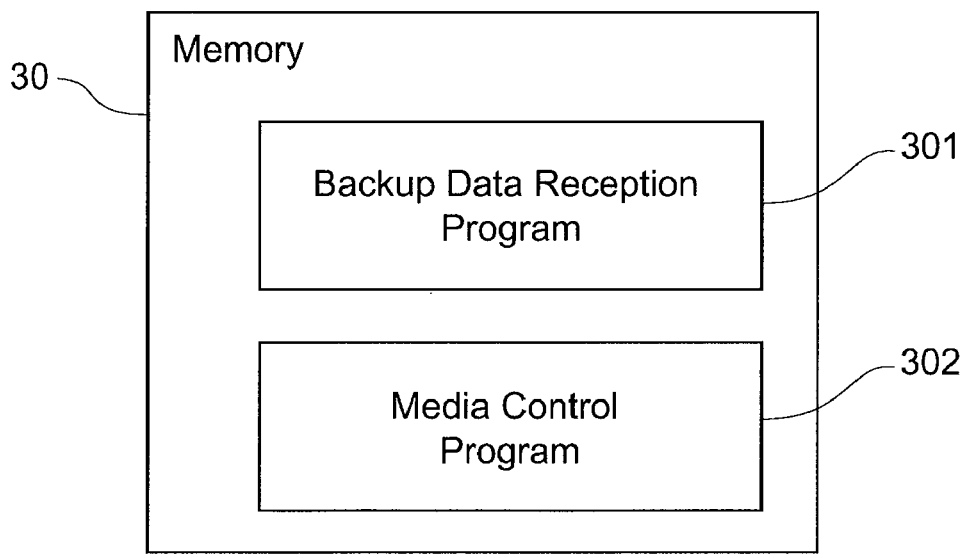
FIG. 17 is a block diagram showing the configuration of a memory for a backup apparatus according to the third embodiment.

FIG. 17 is a block diagram showing the configuration of a memory 30 for the backup apparatus 28. The memory 30 stores a backup data reception program 301 and a media control program 302. The backup apparatus 28 executes the backup data reception program 301 and the media control program 302 by using the CPU 29, receives the backup data sent from the computer 10, and stores the received backup data in the backup media 31.

Figures 18, 19:
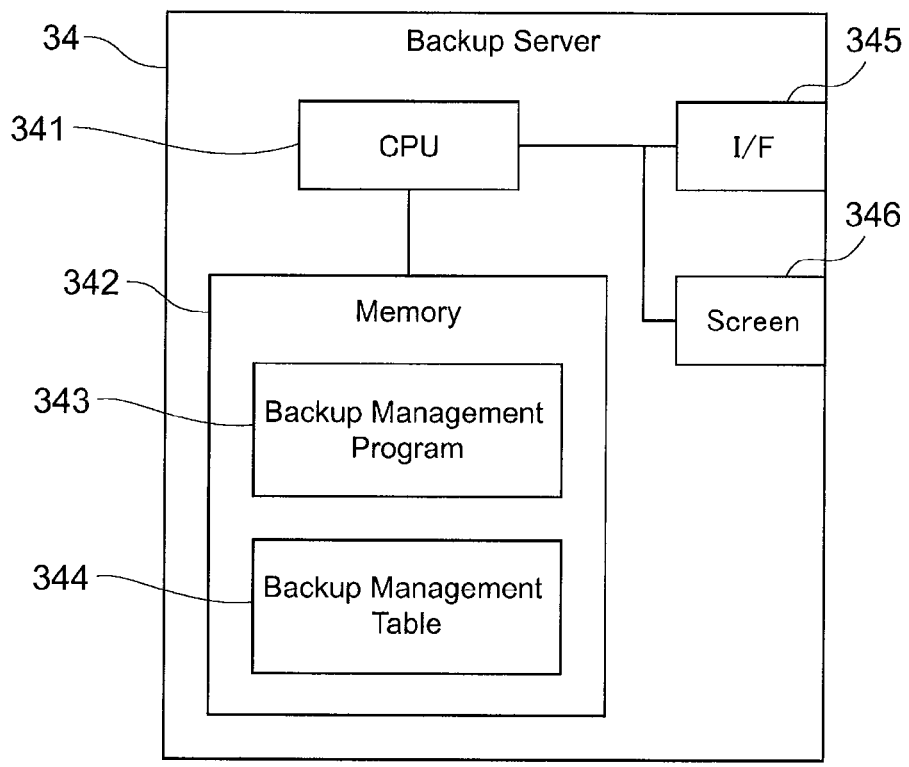
FIG. 18 is a block diagram showing the configuration of a backup server.
FIG. 19 is a configuration diagram showing the configuration of a backup management table.

FIG. 18 is a block diagram showing the configuration of the backup server 34. The backup server 34 is constituted from a CPU 341, a memory 342, a management network interface (hereinafter referred to as the "management I/F") 345, and a screen 346. The management I/F 345 is connected via the management network 26 to the management I/F 20 for the computer 10 and the management I/F 33 for the backup apparatus 28.

The memory 342 stores a backup management program 343 and a backup management table 344. The backup server 34 executes the backup management program 343 by using the CPU 341, and outputs, for example, a command to process the data stored in the storage apparatus 15 for the computer 10 as the backup data, to the computer 10 and the backup apparatus 28.

Incidentally, the backup management program 343 may be configured as a program that operates on the CPU 11 for the computer 10, and the backup management program 343 may be stored together with the backup management table 344 in the memory 12 for the computer 10. Alternatively, the backup management program 343 may be configured as a program that operates on the CPU 29 for the backup apparatus 28, and the backup management program 343 may be stored together with the backup management table 344 in the memory 30.

FIG. 19 is an example of the backup management table 344. The backup management table 344 includes at least a "backup source file system" field 3441 for specifying a file system which is a backup source, a "backup apparatus" field 3442 for specifying where backup data is to be stored, and a "backup media" field 3443 for specifying media to be used for backup.

Furthermore, the backup management table generally has information such as a schedule for backups. However, since such information is not used in this embodiment, that information is omitted.

Incidentally, the content of information described in the backup management table 344 in FIG. 19 is an example.

Figure 20:
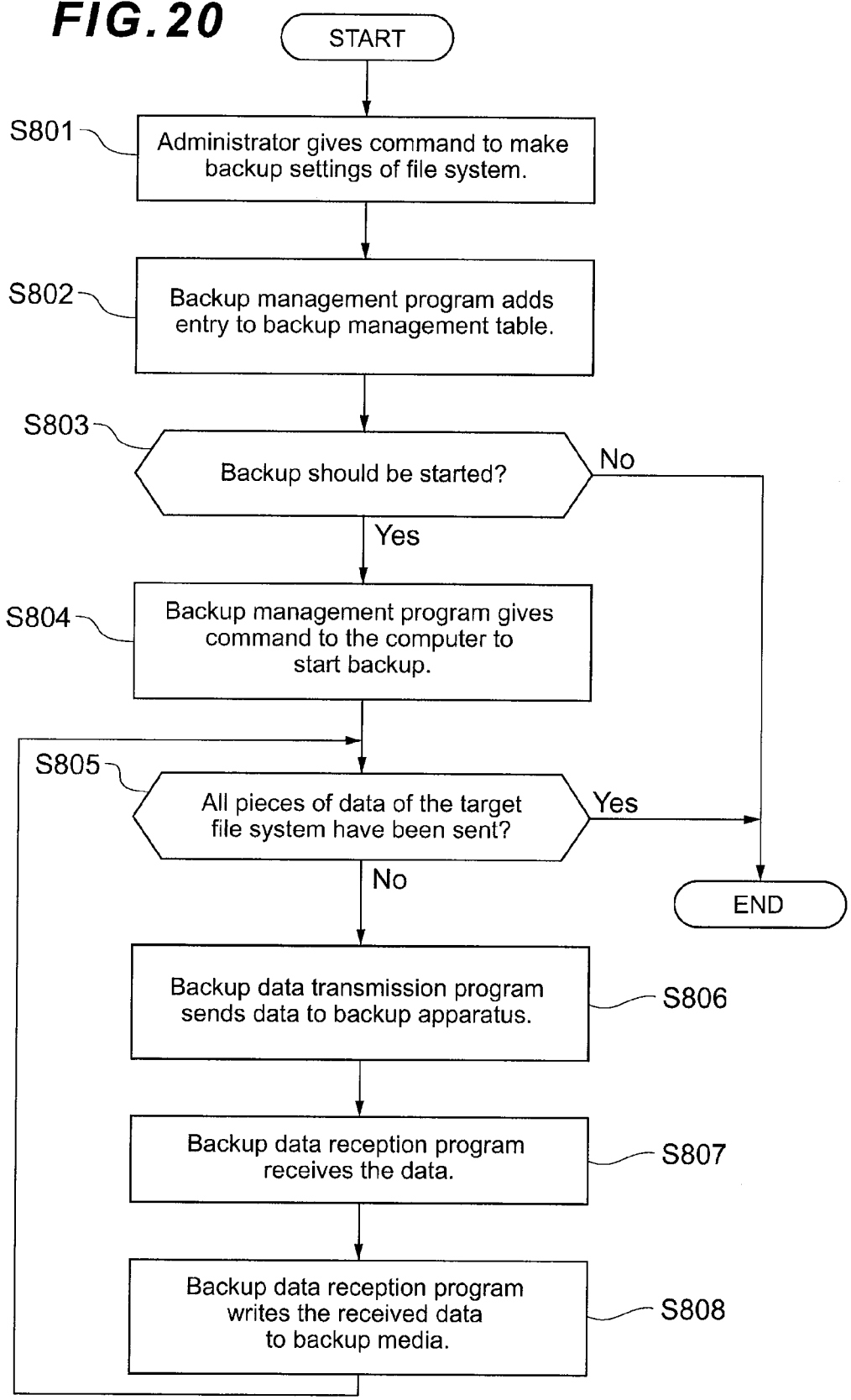
FIG. 20 is a flowchart illustrating a processing sequence for backing up a file system.

FIG. 20 is a flowchart illustrating a processing sequence for backing up a file system to the backup apparatus according to this embodiment.

The administrator first operates the backup server 34 to make backup settings by designating the file system name of a file system which is a backup target, the backup apparatus 28 where backup data is to be stored, and media to be used for backup (S801).

Next, the backup management program 343 for the backup server 34 adds an entry of the backup target file system 16 to the backup management table 344 based on the content designated by the administrator in S801 (S802).

For example, if the backup target file system 16 is "filesystem1," "filesystem1" is stored in the backup source file system 3441 and "backup1" is stored in the backup apparatus 3442 where backup data should be stored, and "tape1, tape2" are stored in the backup media 3443.

Subsequently, the backup management program 343 judges whether backup should be started or not (S803); if it is determined that backup should not be started (NO), that is, if the administrator has given a command to not start backup immediately in S801, the backup management program 343 terminates the processing in this routine.

On the other hand, if it is determined that backup should be started (Yes), that is, if the administrator has given a command to start backup immediately in S801, the backup management program 343 gives a command to the backup data transmission program 121 for the computer 10 to back up data stored in a backup target file system as backup data to the backup apparatus 28 by specifying the file system designated by the administrator in S801 to be the backup target file system and data stored in the backup target file system to be the backup data (S804).

Next, the backup data transmission program 121 executes processing for sending the data stored in the backup target file system to the backup apparatus 28 and then judges whether all the pieces of data in the backup target file system have been sent or not (S805); and if all the pieces of data in the backup target file system have been sent (Yes), the backup data transmission program 121 terminates the processing in this routine; and if there is any data which has not been sent (No), the backup data transmission program 121 executes processing for sending the data, which has not been sent, to the backup apparatus 28 (S806).

Then, the backup data reception program 301 for the backup apparatus 28 executes processing for receiving data from the computer 10 (S807). Subsequently, the media control program 302 executes processing for writing the data received as the backup data by means of the processing executed by the backup data reception program 301, to the backup media 31 such as tape1 and tape2 by associating such backup data with the backup target file system (S808).

The above-described backup processing sequence is an example; and when backing up the backup data to the backup apparatus 28, other technical means capable of backing up the data stored in the file system 16 to the backup apparatus 28 may be used.

Figure 21:
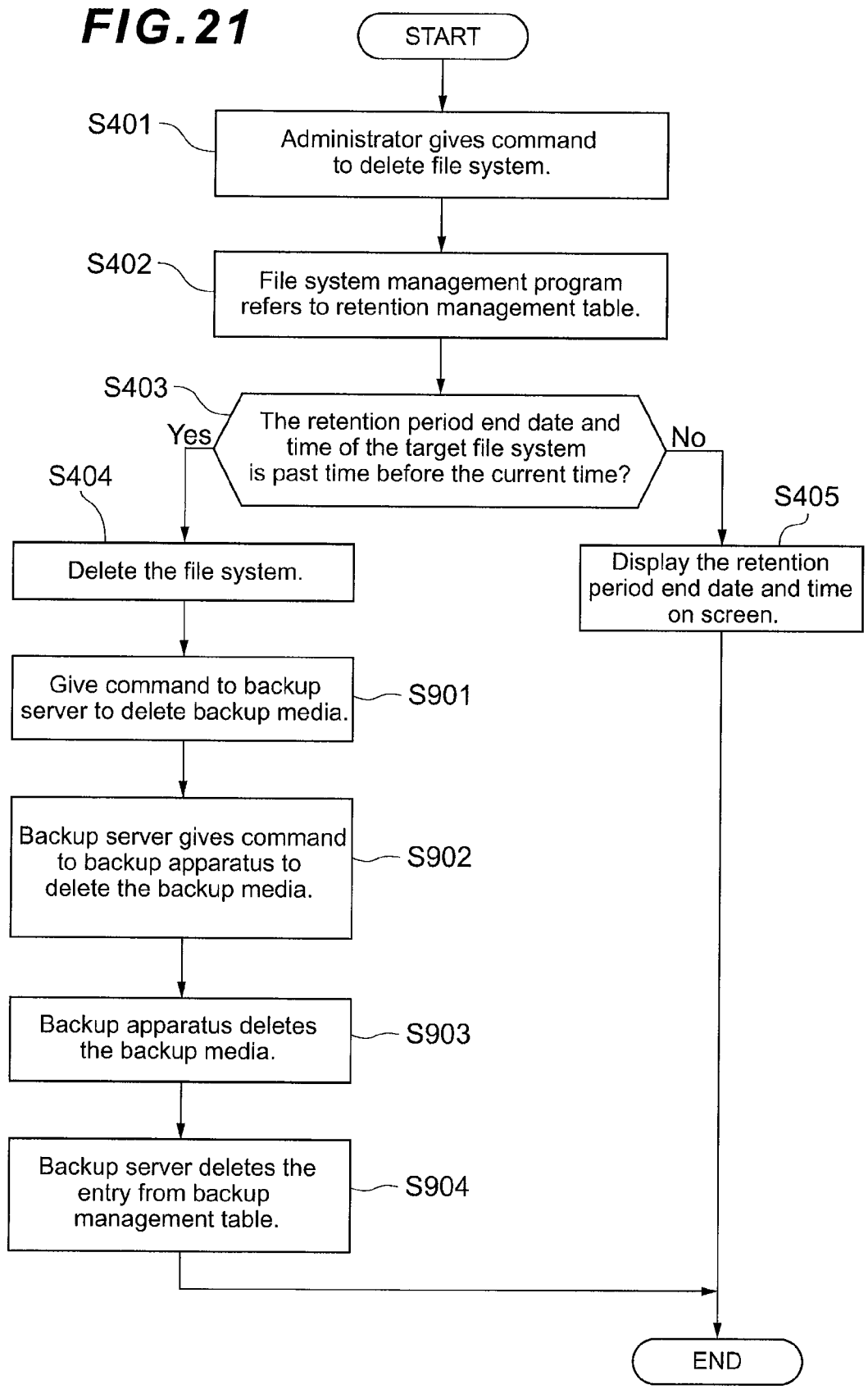
FIG. 21 is a flowchart illustrating a processing sequence for deleting a WORM file system according to the third embodiment.

FIG. 21 is a flowchart illustrating a processing sequence for deleting a file system according to this embodiment.

Firstly, a processing sequence for setting the retention period to a file stored in a file system with the WORM attribute and processing for deleting a file which is stored in the file system with the WORM attribute and to which the retention period is set, by exercising a privilege of doing so according to this embodiment (S401 to S404) are the same as those in the first embodiment, as is S405.

After deleting the backup target file system 16 stored in the storage apparatus 15 in S404, the file system management program 13 gives a command to the backup management program 343 for the backup server 34 to delete the backup media 31 where the backup data of the backup target file system 16 is stored (S901).

Next, the backup management program 343 refers to the backup management table 344, obtains the entry corresponding to the file system to be deleted 16 designated in S901, and gives a command to the media control program 302 for the backup apparatus 28 via the management network 26 to delete the backup media 3443 stored in the backup apparatus 3442 of the obtained entry (S902).

Subsequently, the media control program 302 for the backup apparatus 28 deletes the backup data stored in the designated backup media 31 such as tape1 and tape2 (S903).

Finally, the backup management program 343 deletes the entry corresponding to the file system to be deleted 16 from the backup management table 344 and then terminates the processing in this routine(S904).

When having the computer 10 delete the file system, which has the WORM attribute and should be deleted, by means of the above-described processing, the backup apparatus 28 can delete the backup data corresponding to the file system to be deleted 16 merely by having the computer 10 give the command via the backup server 34 to the backup apparatus 28 to delete the file system to be deleted 16, on condition that the retention periods of all the files in the file system to be deleted have expired.

Under the circumstances described above, it can be presumed that the backup apparatus 28 storing the file system to be deleted 16 whose retention period has expired, stores a large amount of files. However, since it is unnecessary for the backup apparatus 28 to check if the retention periods of all the files stored in the backup media 31 have expired or not, the processing for deleting the file system to be deleted 16 can be executed at high speed.

Incidentally, on condition that the retention periods of all the files in the file system to be deleted have expired, the computer 10 can delete data of the backup target file system 16 stored in the storage apparatus 15 and directly give a command to the media control program 302 for the backup apparatus 28 to delete the backup target file system 16 by storing the information of the backup management table 344 in the memory 12 for the computer 10.

Fourth Embodiment

This embodiment is designed so that when selecting a file system with the WORM attribute as the file system to be deleted and deleting the file system to be deleted, another computer that temporarily uses data of the file system to be deleted as cache data is given a command (notice) to delete the file system to be deleted on condition that the retention periods of all the files in the file system to be deleted have expired; and, as a result, that other computer deletes the cache data corresponding to the file system to be deleted.

Specifically speaking, this embodiment relates to a computer system including a cache computer 36 that is connected to the computer 10 via the data network 27, fetches data of the file system 16 stored in the storage apparatus 15 for the computer 10 from the backup apparatus 28, temporarily stores the fetched data as cache data, and manages the cache data in accordance with commands from the computer 10.

If a deletion request to delete the file system to be deleted is made from the management computer 23 under the above-described circumstances, and if the retention period end date and time of the file system to be deleted is a past time before the current time when the deletion request is made, the computer 10 deletes the file system to be deleted and also gives a command to the cache computer 36 to delete the cache data corresponding to the file system to be deleted. The cache computer 36 then deletes the cache data corresponding to the file system to be deleted in response to the command from the computer 10.

Furthermore, when the deletion request to delete the file system to be deleted is made from the management computer 23, the computer 10 compares the current time when the deletion request is made with the retention period end date and time of the file system to be deleted; and if the retention period end date and time of the file system to be deleted is a future time ahead of the current time when the deletion request is made, the retention period end date and time of the file system to be deleted is displayed on the screen 235 or the display device for the computer 10, which is done in the same manner as in the first and second embodiments.

Figure 22:
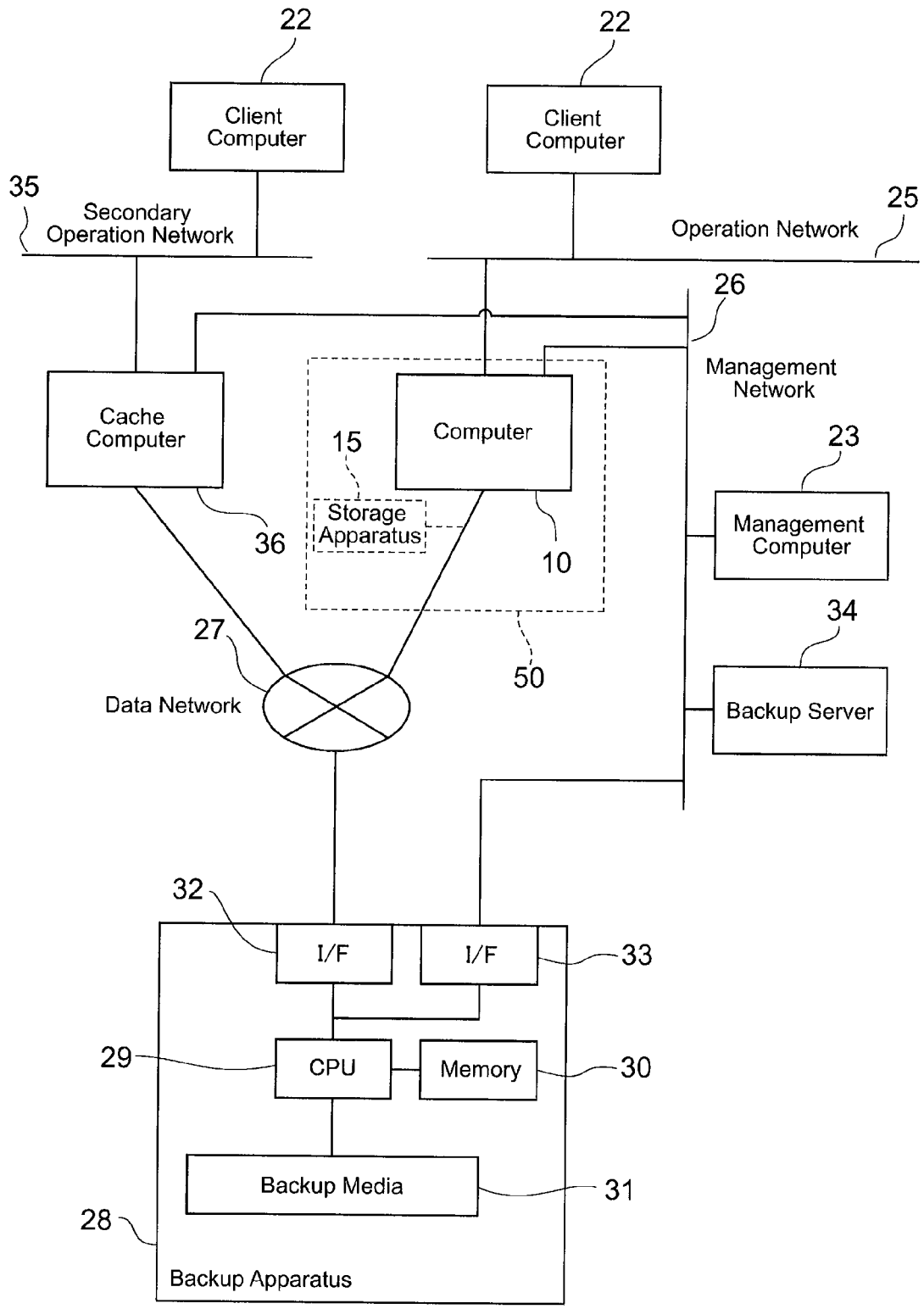
FIG. 22 is a block diagram showing the configuration of a computer system according to the fourth embodiment.

FIG. 22 is a schematic diagram of the computer system according to this embodiment. This computer system is configured by adding the cache computer 36 which uses, as cache data, the data of the file system stored in the storage apparatus 15 for the computer 10, and a secondary operation network 35 for connection to the client computer 22, to the computer system shown in FIG. 15.

Figure 23:
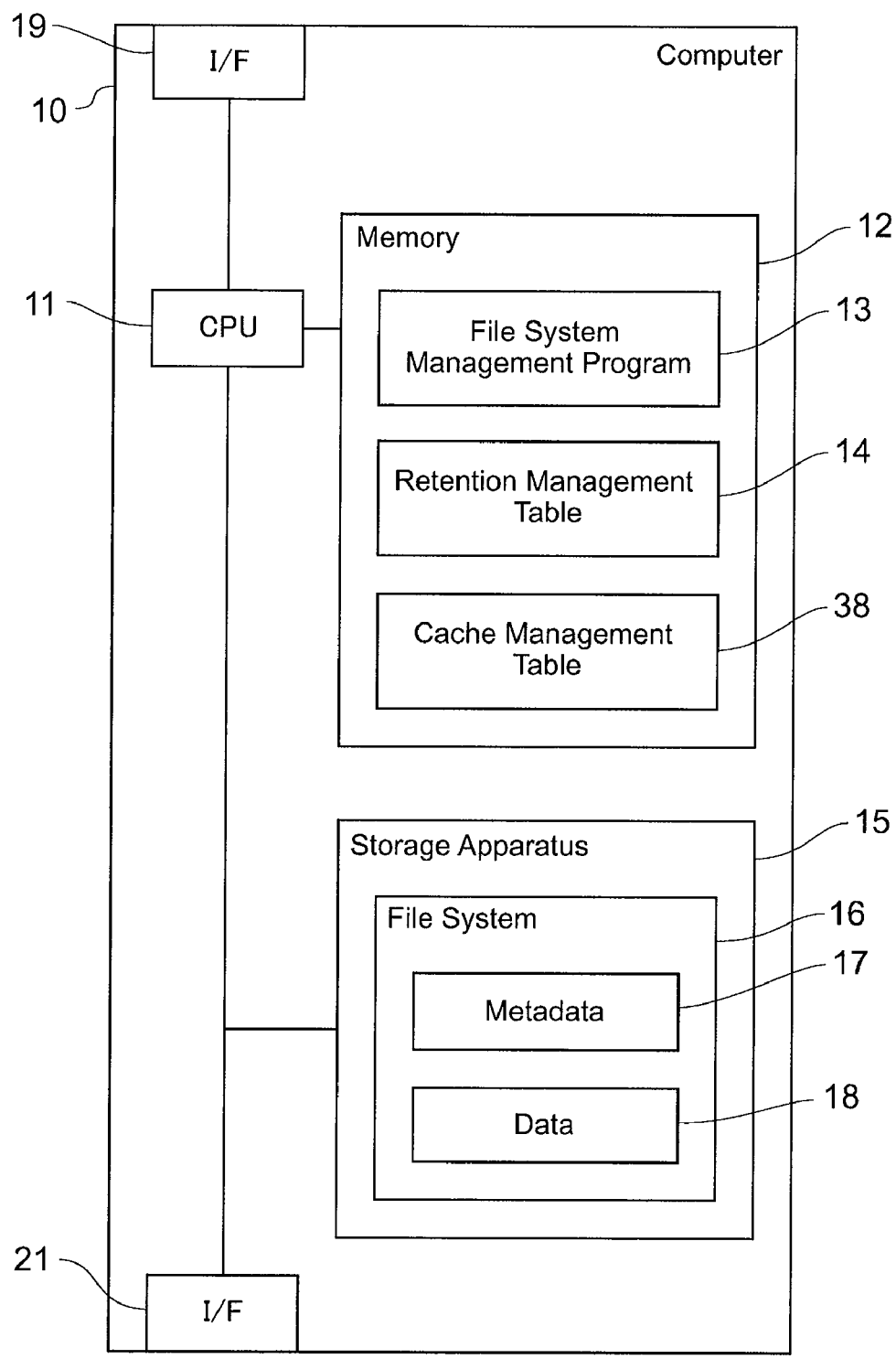
FIG. 23 is a block diagram showing the configuration of a computer according to the fourth embodiment.

FIG. 23 is a block diagram showing the configuration of the computer 10 according to this embodiment. The memory 12 for the computer 10 according to this embodiment stores, in addition to the file system management program 13 and the retention management table 14, a cache management table 38 containing information for managing the cache computer 36 which uses data of each file system 16 as cache data.

FIG. 24 shows an example of the cache management table 38. The cache management table 38 includes at least a "file system name" field 381 and a "cache computer" field 382. Each entry of the "file system name" field 381 stores the name of each file system 16. The "cache computer" field 382 stores a computer(s) that permits the use of data stored in the file system of each entry as cache data. This prevents unauthorized reference to the data of the file systems.

Figure 25:
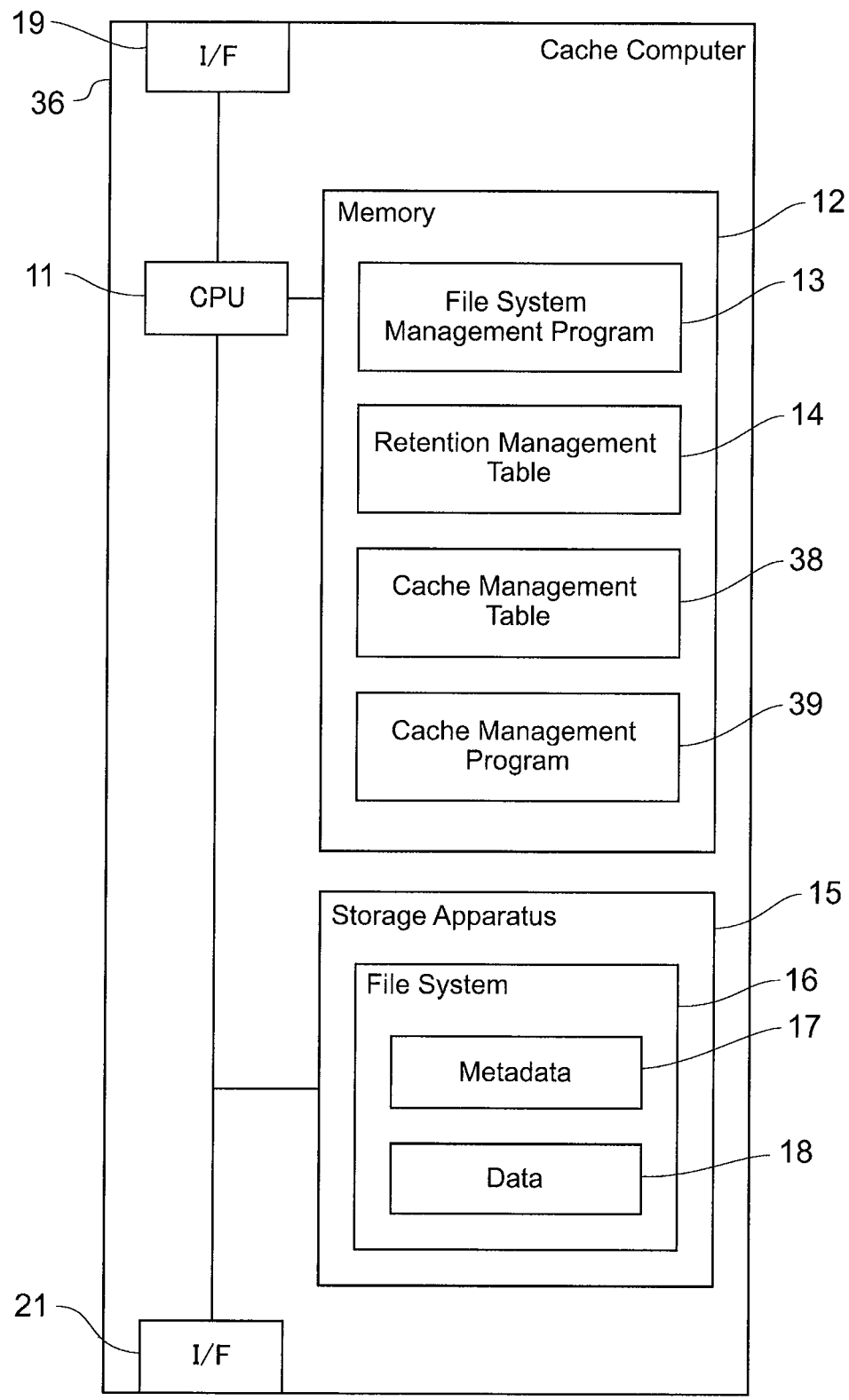
FIG. 25 is a block diagram showing the configuration of a cache computer.

FIG. 25 is a block diagram showing the configuration of the cache computer 36. The cache computer 36 has almost the same configuration as that of the computer 10 shown in FIG. 23, but the memory 12 for the cache computer 36 stores, in addition to the file system management program 13, the retention management table 14, and the cache management table 38, a cache management program 39 for obtaining backup data corresponding to each file system 16 from the backup apparatus 28 and temporarily storing the obtained backup data as cache data. The cache computer 36 executes the cache management program 39 by using the CPU 11.

Incidentally, when the data of each file system 16 is sent as the backup data from the computer 10 to the backup apparatus 28, this data can also be sent from the computer 10 to the cache computer 36 and the cache computer 36 can store the backup data as the cache data.

Figure 26:
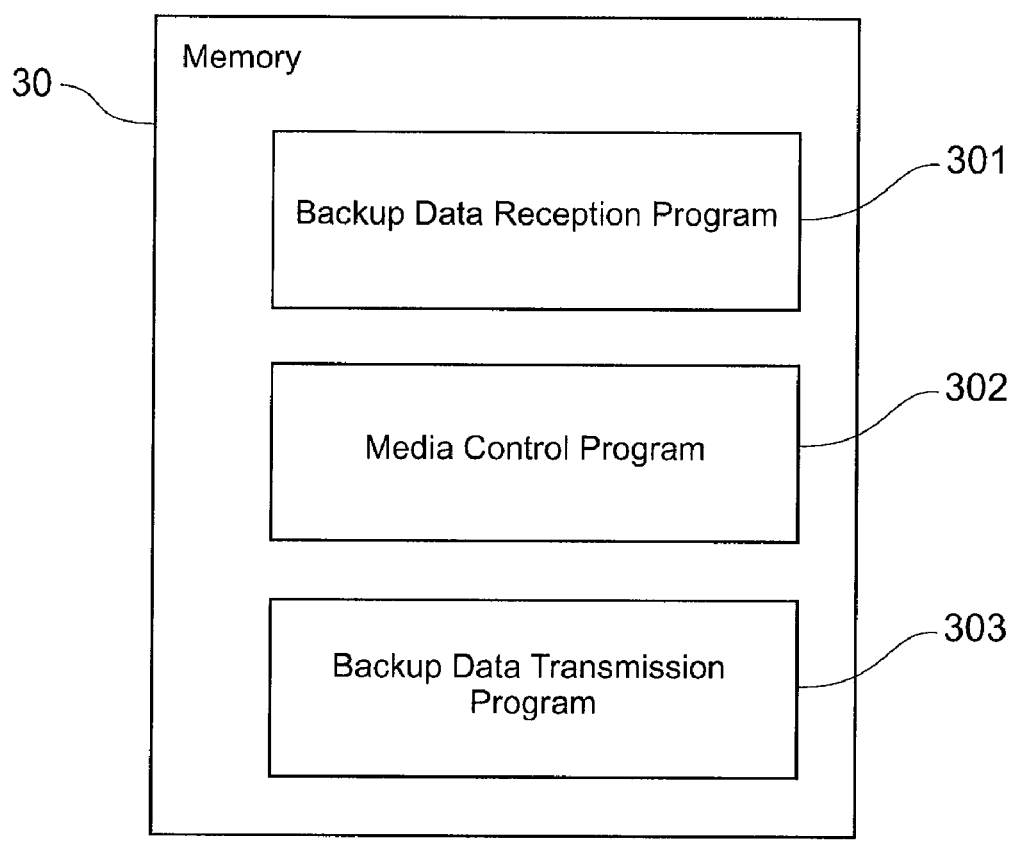
FIG. 26 is a block diagram showing the configuration of a memory for a backup apparatus according to the fourth embodiment.

FIG. 26 is a block diagram showing the configuration of the memory 30 for the backup apparatus 28 according to this embodiment. The memory 30 stores a backup data transmission program 303 in addition to the backup data reception program 301 and the media control program 302, and the backup apparatus 28 executes the backup data transmission program 303 by using the CPU 29. As a result of the execution of the backup data transmission program 303 by the CPU 29, the backup data can be sent from the backup apparatus 28 to the cache computer 36.

Figure 27:
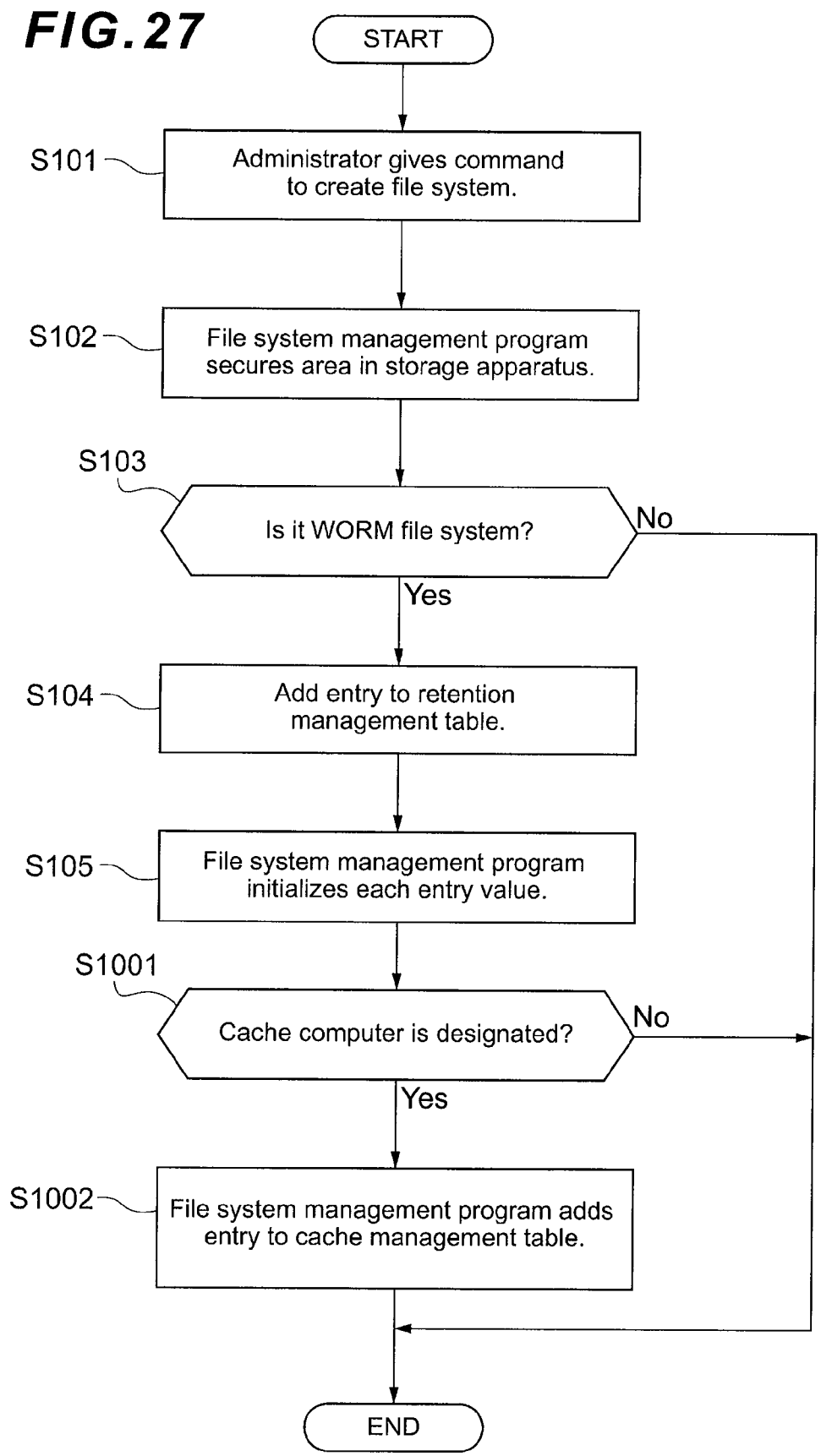
FIG. 27 is a flowchart illustrating a processing sequence for creating a file system according to the fourth embodiment.

FIG. 27 is a flowchart illustrating a processing sequence for creating a file system according to this embodiment.

The processing steps starting from the operation of the management computer 23 by the administrator to give a command to the file system management program 13 to create a file system having the WORM attribute (S101), to initialization of the retention management table 14 by the file system management program 13 (S105) are the same as those in the first embodiment (see FIG. 6).

Subsequently, if the administrator does not designate the cache computer 36 for using the backup data as the cache data in step S1001 (No), the file system management program 13 terminates the processing in this routine.

On the other hand, if the administrator designates the cache computer 36 for using the backup data as the cache data in step S1001 (Yes), the file system management program 13 for the cache computer 36 adds an entry to the cache management table 38 in response to the management computer 23, inputs the file system name 381 and the cache computer 382 (S1002), and then terminates the processing in this routine.

Figure 28:
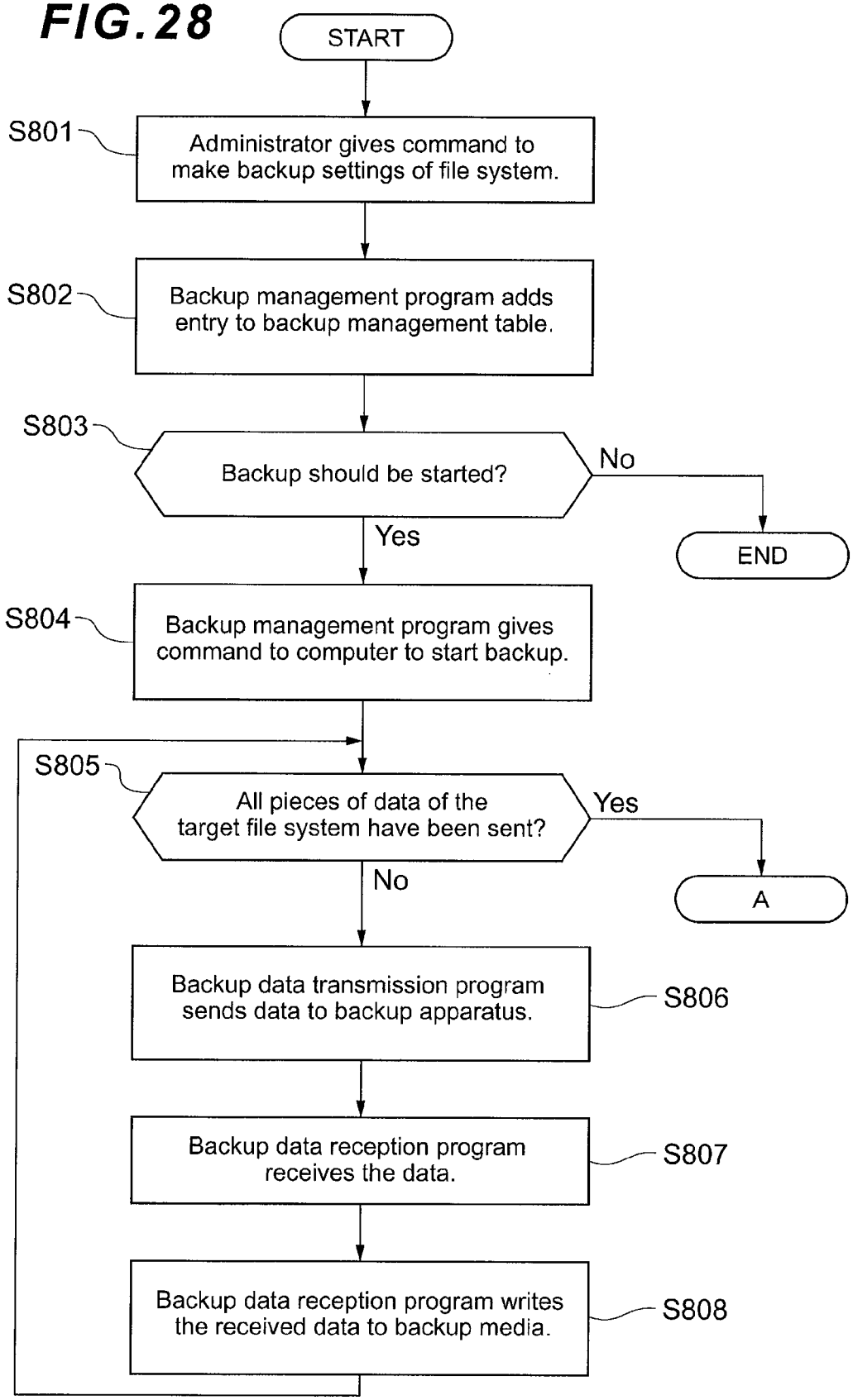
FIG. 28 is a flowchart illustrating a processing sequence for caching backup data.
Figure 29:
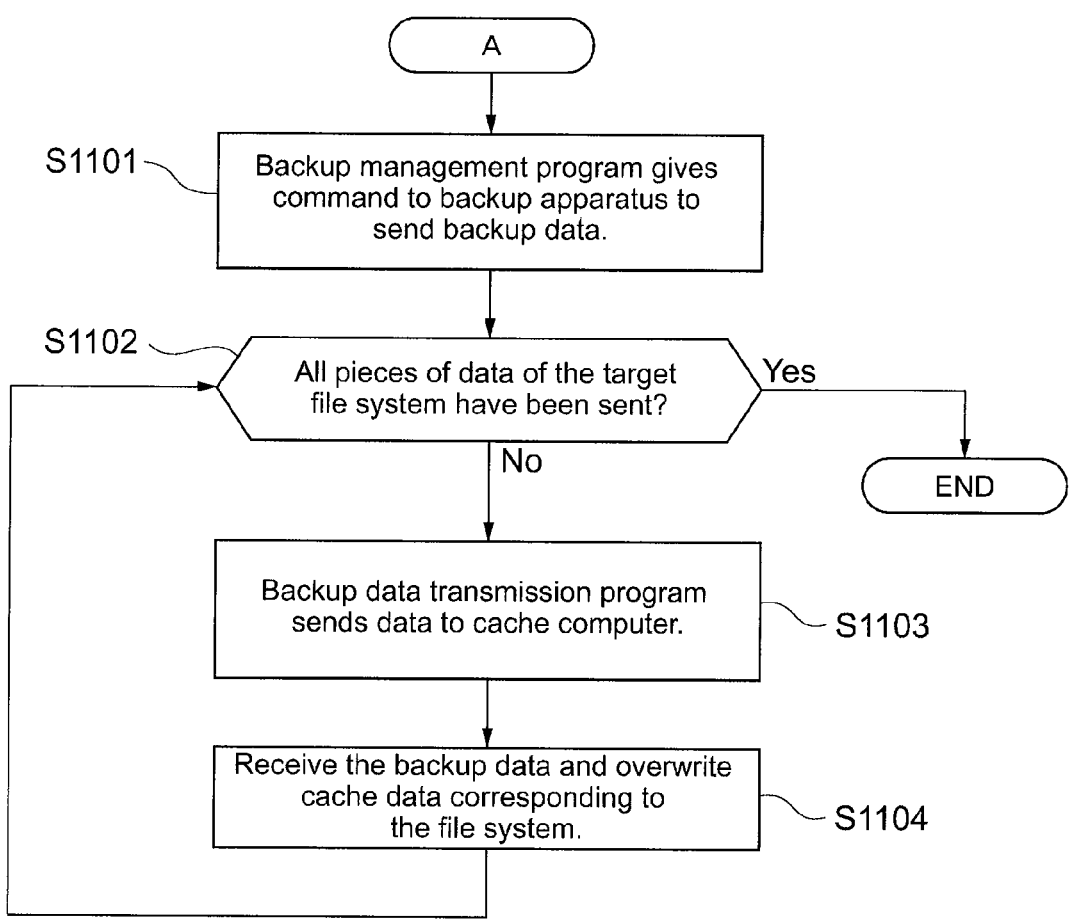
FIG. 29 is a flowchart illustrating a processing sequence for caching backup data.

FIGS. 28 and 29 are flowcharts illustrating a processing sequence executed by the cache computer 36 for storing the backup data as cache data according to this embodiment.

The processing steps starting from the operation of the backup server 34 by the administrator to make backup settings by designating the file system name of the backup target file system 16, the backup apparatus 28 where backup data is to be stored, and media to be used for backup (S801), to the step of backing up the backup data in the backup apparatus 28 (S808) are the same as those in the third embodiment (see FIG. 20).

After sending the whole data of the backup target file system from the computer 10 to the backup apparatus 28 in step S805 (Yes), the backup management program 343 for the backup server 34 gives a command to the backup data transmission program 303 in the backup apparatus 28 to send the data to the cache computer 36 as shown in FIG. 29 (S1101).

Next, the backup data transmission program 303 in the backup apparatus 28 sends the backup data corresponding to the backup target file system 16 to the cache computer 36 and checks if all the pieces of backup data corresponding to the backup target file system 16 have been sent or not (S1102). If all the pieces of backup data corresponding to the backup target file system 16 have been sent (Yes), the backup data transmission program 303 terminates the processing in this routine; and if there is any backup data which has not been sent yet (No), the backup data transmission program 303 sends the backup data, which has not been sent, to the cache computer 36 (S1103).

Then, the cache computer 36 receives the backup data sent from the backup apparatus 28, temporarily stores the received backup data as the cache data in the storage apparatus 15, and overwrites the cache data corresponding to the backup target file system 16 (S1104).

The above-described sequence for caching the backup data is an example; and when using backup data as cache data, other technical means of backing up the data of the backup target file system 16 as backup data in the backup apparatus 28 and then enabling another computer to cache the backup data may be used.

Figure 30:
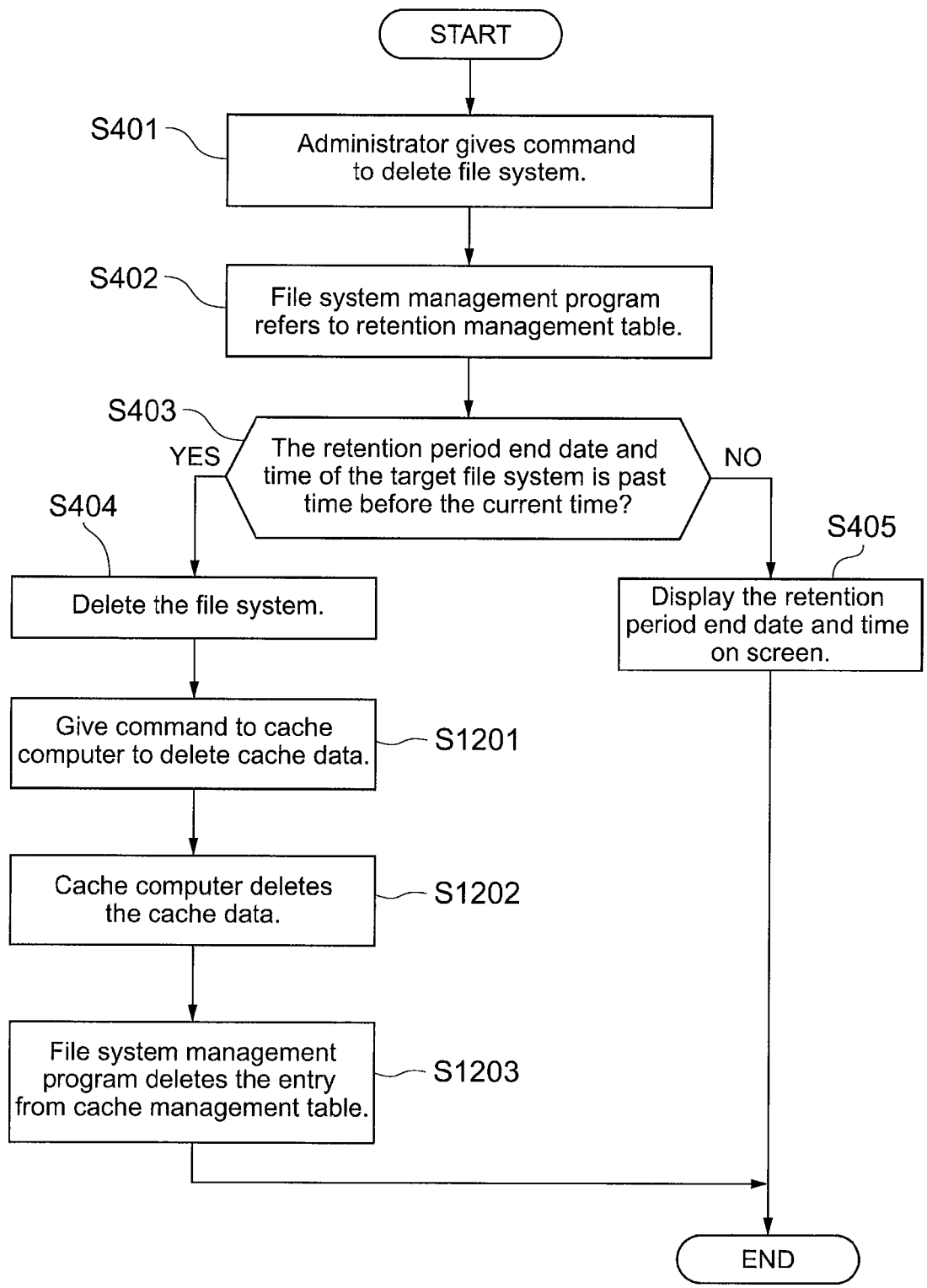
FIG. 30 is a flowchart illustrating a processing sequence for deleting a WORM file system according to the fourth embodiment.

FIG. 30 is a flowchart illustrating a processing sequence for deleting a file system according to this embodiment.

Firstly, processing sequence for setting the retention period to a file stored in a file system with the WORM attribute, processing for deleting a file which is stored in the file system with the WORM attribute and to which the retention period is set, by exercising a privilege of doing so (S401 to S404), and processing for displaying the retention period end date and time on the screen (S405) according to this embodiment are the same as those in the first embodiment.

After deleting the file system to be deleted 16 in step S404, the file system management program 13 gives a command to the cache management program 39 in the cache computer 36 to delete cache data of a backup target file system corresponding to the file system to be deleted 16 (S1201).

Next, the cache management program 39 for the cache computer 36 deletes the cache data of the backup target file system 16 (S1202).

Subsequently, the file system management program 13 deletes the entry corresponding to the backup target file system 16 from the cache management table 38 and then terminates the processing in this routine (S1203).

Incidentally, the backup deletion procedures from S901 to S904 described in the third embodiment may be performed before the processing procedures from S1201 to S1203.

When having the computer 10 delete the file system, which has the WORM attribute and should be deleted, by means of the above-described processing, the cache computer 36 can delete the cache data of the backup target file system 16 simply by having the computer 10 give a command to the cache computer 36 to delete the backup target file system 16 corresponding to the file system to be deleted 16 on condition that the retention periods of all the files in the file system to be deleted have expired.

Under the circumstances described above, it can be presumed that the cache computer 36 storing the backup target file system 16 whose retention period has expired, stores a large amount of files. However, since it is unnecessary for the cache computer 36 to check if the retention periods of all the files stored in the cache data have expired or not, the cache computer 36 can execute the processing for deleting the cache data at high speed.

Each of the aforementioned embodiments has described the case where a file is deleted by exercising the privilege of doing so. However, the present invention can be also applied to the case where a file is deleted without exercising the privilege.

REFERENCE SIGNS LIST

10 Computer
11 CPU for the computer
12 Memory for the computer
13 File system management program
14 Retention management table
15 Storage apparatus
16 File system
17 Metadata
18 Data
19 Operation network interface
20 Management network interface
21 Data interface
22 Client computer
23 Management computer
24 External storage apparatus
25 Operation network
26 Management network
27 Data network
28 Backup apparatus
29 CPU
30 Memory
31 Backup media
32 Data interface
33 Management network interface
34 Backup server
35 Secondary operation network
36 Cache computer

The invention claimed is:

1. A computer comprising:
a storage apparatus storing a filing system including a plurality of files;
a processor assigning each of the files an attribute to prohibit deletion of each file until the elapse of its retention period end time and managing the file system by setting a furthest future retention period end time from among the retention period end times of the files as a deletion prohibition end time of the file system;
a display device displaying information relating to management of the processor; and
retention management information for managing an identifier for identifying the file system, a retention period end date and time of the file system, for which the furthest future retention period end date and time along a time axis from among retention period end dates and times of the plurality of files included in the file system is defined as the deletion prohibition end time of the file system, and a counter for counting the number of files, from among those included in the file system, whose retention period end date and time matches the retention period end date and time of the file system, by associating them with each other;
wherein if a retention period of any of the files included in the file system is set and the retention period end date and time of the set file matches the retention period end date and time of the file system by referring to the retention management information, the processor increases a value of the counter by one; and if the retention period end date and time of the set file is a future time ahead of the retention period end date and time of the file system along the time axis, the processor overwrites and updates the retention period end date and time of the file system with the retention period end date and time of the set file and sets the value of the counter to one; and wherein, in case of a reception of a deletion request, the processor compares time of the deletion request with the retention period end date and time of the file system by referring to the retention management information; and if the time of the deletion request matches the retention period end date and time of the file system, the processors decreases the value of the counter by one; and if the value of the counter becomes zero as a result of the decrease of the counter value by one, the processor searches the retention period end dates and times of all the files included in the file system, sets the furthest future retention period end date and time along the time axis from among the retention period end dates and times of the files obtained as a result of the search, as the retention period end date and time of the file system, and sets the number of files, for which the same retention period end date and time as the retention period end date and time of the file system which has been set is set, as the value of the counter; and if the retention period end date and time of the file system is a future time ahead of the time of the deletion request or the value of the counter does not become zero as a result of the decrease of the counter value by one, the processor has the display device display the retention period end date and time of the file system.

2. The computer according to claim 1, wherein the processor manages the plurality of files belonging to the file system by dividing them into a plurality of groups based on the retention period end time; and if the deletion prohibition end time of the file system is a future time ahead of the time of the deletion request, the processor has the display device display the deletion prohibition end time of the file system and names of the respective files belonging to a certain group associated with the furthest future retention period end time from among the plurality of groups.

3. The computer according to claim 1, wherein when a deletion request is made to delete one file belonging to the file system, and if a deletion target file designated by the request to delete the one file is a file with the furthest future retention period end time among the plurality of files and the number of files of a certain group to which the deletion target file belongs is one, the processor: deletes the deletion target file which is the one file, sets files belonging to groups other than the group to which the deletion target file belongs, as search target files, extracts, from the search target files, a file belonging to a group whose retention period end time assigned to the relevant search target file is the second furthest future retention period end time next to the retention period end time assigned to the deletion target file, and sets the retention period end time of the extracted file as the deletion prohibition end time of the file system.

4. The computer according to claim 3, wherein the processor manages the plurality of files belonging to the file system by dividing them into a plurality of groups based on the retention period end time and also manages the number of files belonging to each of the groups; and if the deletion target file which is the one file is deleted, the processor: extracts, from the search target files, a file or files belonging to a group whose retention period end time assigned to the relevant search target file is the second furthest future retention period end time next to the retention end period end time assigned to the deletion target file, as well as the number of such file or files, has the display device display the number of the extracted file or files, and also has the display device display the retention period end time of the extracted file or files as the deletion prohibition end time of the file system.

5. The computer according to claim 4, wherein if the deletion prohibition end time of the file system is future time ahead of a current time when the deletion request is made, the processor stops deletion processing on the file system designated by the deletion request; and if the deletion prohibition end time of the file system is past time before the current time when the deletion request is made, the processor executes deletion processing on the file system designated by the deletion request.

6. A processing method for a computer comprising:
a storage apparatus storing a filing system including a plurality of files;
a processor for assigning each of the files an attribute to prohibit deletion of each file until the elapse of its retention period end time, and managing the file system by setting the furthest future retention period end time along a time axis from among the retention period end times of the files as a deletion prohibition end time of the file system; and
a display device for displaying information relating to management of the processor;
retention management information for managing an identifier for identifying the file system, a retention period end date and time of the file system, for which the furthest future retention period end date and time along a time axis from among retention period end dates and times of the plurality of files included in the file system is defined as the deletion prohibition end time of the file system, and a counter for counting the number of files, from among those included in the file system, whose retention period end date and time matches the retention period end date and time of the file system, by associating them with each other;
wherein if a retention period of any of the files included in the file system is set and the retention period end date and time of the set file matches the retention period end date and time of the file system by referring to the retention management information, the processor increases a value of the counter by one; and if the retention period end date and time of the set file is a future time ahead of the retention period end date and time of the file system along the time axis, the processor overwrites and updates the retention period end date and time of the file system with the retention period end date and time of the set file and sets the value of the counter to one; and
wherein the processor executes:
a comparison step executed when a deletion request for the file system is made, of comparing a current time when the deletion request is made, with the retention period end date time of the file system by referring to the retention management information; and if the time of the deletion request matches the retention period end date and time of the file system, the processors decreases the value of the counter by one; and if the value of the counter becomes zero as a result of the decrease of the counter value by one, the processor searches the retention period end dates and times of all the files included in the file system, sets the furthest future retention period end date and time along the time axis from among the retention period end dates and times of the files obtained as a result of the search, as the retention period end date and time of the file system, and sets the number of files, for which the same retention period end date and time as the retention period end date and time of the file system which has been set is set, as the value of the counter; and a display step of having the display device display the retention period end date and time of the file system if the retention period end date and time of the file system is a future time ahead of the time of the deletion request or the value of the counter does not become zero as a result of the decrease of the counter value by one.

7. The computer processing method according to claim 6, wherein the processor executes a management step of managing the plurality of files belonging to the file system by dividing them into a plurality of groups based on the retention period end time and associating each file belonging to each group with a name of each file; and if it is determined in the comparison step that the deletion prohibition end time of the file system is the future time ahead of the current time of the deletion request, the processor has the display device display the deletion prohibition end time of the file system and the name of each file belonging to the group with the furthest future retention period end time, among the plurality of groups, in the display step.

8. The computer processing method according to claim 7, wherein when a deletion request to delete one file belonging to the file system is made, and if the deletion target file designated by the deletion request to delete the one file, is a file with the furthest future retention period end time among the plurality of files and the number of files of a group to which the deletion target file belongs is one, the processor executes a deletion step of deleting the deletion target file which is the one file and an extraction step of setting files belonging to groups other than the group to which the deletion target file belongs, as search target files and extracting, from the search target files, a file belonging to a group whose retention period end time assigned to the relevant search target file is the second furthest future retention period end time next to the retention period end time assigned to the deletion target file; and wherein in the display step, the processor has the display device display the retention period end time of the file extracted in the extraction step as the deletion prohibition end time of the file system.

9. The computer processing method according to claim 8, wherein if it is determined in the comparison step that the deletion prohibition end time of the file system is future time ahead of the current time when the deletion request is made, the processor executes a stop step of stopping deletion of the file system designated by the deletion request; and if it is determined in the comparison step that the deletion prohibition end time of the file system is past time before the current time when the deletion request is made, the processor executes a deletion step of deleting the file system designated by the deletion request.

10. A computer system comprising:

a computer including:

a storage apparatus storing a filing system including a plurality of files;

a processor assigning each of the files an attribute to prohibit deletion of each file until the elapse of its retention period end time and managing the file system by setting the furthest future retention period end time along a time axis from among the retention period end times of the files as deletion prohibition end time of the file system;

a display device displaying information relating to management of the processor; and retention management information for managing an identifier for identifying the file system, a retention period end date and time of the file system, for which the furthest future retention period end date and time along the time axis from among retention period end dates and times of the plurality of files included in the file system is defined as the deletion prohibition end time of the file system, and a counter for counting the number of files, from among those included in the file system, whose retention period end date and time matches the retention period end date and time of the file system, by associating them with each other; and a backup apparatus connected via a network to the computer, for fetching data in the file system stored in the storage apparatus, storing it as backup data, and managing the backup data in accordance with a command from the computer;

wherein if a retention period of any of the files included in the file system is set and the retention period end date and time of the set file matches the retention period end date and time of the file system by referring to the retention management information, the processor increases a value of the counter by one; and if the retention period end date and time of the set file is future time ahead of the retention period end date and time of the file system along the time axis, the processor overwrites and updates the retention period end date and time of the file system with the retention period end date and time of the set file and sets the value of the counter to one; and wherein, in case of a reception of a deletion request, the processor compares current time of the deletion request with the retention period end date and time of the file system by referring to the retention management information; and if the current time of the deletion request matches the retention period end date and time of the file system, the processors decreases the value of the counter by one; and if the value of the counter becomes zero as a result of the decrease of the counter value by one, the processor searches the retention period end dates and times of all the files included in the file system, sets the furthest future retention period end date and time along the time axis from among the retention period end dates and times of the files obtained as a result of the search, as the retention period end date and time of the file system, and sets the number of files, for which the same retention period end date and time as the retention period end date and time of the file system which has been set is set, as the value of the counter; and if the retention period end date and time of the file system is future time ahead of the time of the deletion request or the value of the counter does not become zero as a result of the decrease of the counter value by one, the processor has the display device display the retention period end date and time of the file system; and if the retention period end date and time of the file system is past time before the time of the deletion request, the processor deletes the file system; and wherein if the file system is deleted by the processor, the backup apparatus deletes the backup data corresponding to the deleted file system.

11. The computer system according to claim 10, wherein if the deletion prohibition end time of the file system is past time before the current time when the deletion request is made, the processor for the computer executes deletion processing on the file system designated by the deletion request and gives a command to the backup apparatus to delete the backup data corresponding to the file system designated by the deletion request; and the backup apparatus deletes the backup data corresponding to the file system designated by the deletion request in accordance with the command from the processor for the computer.

12. The computer system according to claim 11, further comprising a cache computer connected via the network to the computer, for temporarily storing data of the file system stored in the storage apparatus as cache data and managing the cache data in accordance with a command from the computer, wherein if the deletion prohibition end time of the file system is past time before the time of the deletion request, the processor for the computer gives a command to the cache computer to delete the cache data corresponding to the file system designated by the deletion request; and the cache computer deletes the cache data corresponding to the file system designated by the deletion request in accordance with the command from the processor for the computer.

13. The computer system according to claim 12, wherein if the deletion prohibition end time of the file system is future time ahead of the time of the deletion request, the processor for the computer stops the deletion processing on the file system designated by the deletion request; and if the deletion prohibition end time of the file system is past time before the current time of the deletion request, the processor for the computer executes the deletion processing on the file system designated by the deletion request.

* * * * *